(12) United States Patent
Jones

(10) Patent No.: US 12,505,366 B2
(45) Date of Patent: Dec. 23, 2025

(54) SIMULATING QUANTUM COMPUTING CIRCUITS USING KRONECKER FACTORIZATION

(71) Applicant: NVIDIA Corporation, Santa Clara, CA (US)

(72) Inventor: Matthew Jones, Longmont, CO (US)

(73) Assignee: NVIDIA Corporation, Santa Clara, CA (US)

( * ) Notice: Subject to any disclaimer, the term of this patent is extended or adjusted under 35 U.S.C. 154(b) by 591 days.

(21) Appl. No.: 18/060,498

(22) Filed: Nov. 30, 2022

(65) Prior Publication Data

US 2024/0177034 A1 May 30, 2024

(51) Int. Cl.
*G06N 10/20* (2022.01)
(52) U.S. Cl.
CPC .................................. *G06N 10/20* (2022.01)
(58) Field of Classification Search
CPC ....................................................... G06N 10/20
See application file for complete search history.

(56) References Cited

U.S. PATENT DOCUMENTS

| | | | | |
|---|---|---|---|---|
| 11,170,137 B1* | 11/2021 | Richardson | | G06N 10/20 |
| 11,550,872 B1* | 1/2023 | Jiang | | G06N 10/20 |
| 11,568,293 B2* | 1/2023 | Linvill | | G06N 10/80 |
| 12,277,510 B2* | 4/2025 | Pramanik | | G06N 7/00 |
| 2018/0307988 A1* | 10/2018 | Fano | | G06N 7/04 |
| 2018/0308000 A1* | 10/2018 | Dukatz | | G06N 10/60 |
| 2022/0179737 A1* | 6/2022 | Jones | | G06F 16/9024 |
| 2023/0099621 A1* | 3/2023 | Shi | | G06N 3/006 |
| 2023/0186131 A1* | 6/2023 | Patel | | G06N 10/20 |
| | | | | 703/14 |
| 2024/0005189 A1* | 1/2024 | Patel | | G06N 10/20 |
| 2024/0086749 A1* | 3/2024 | Richardson | | G06F 9/5066 |
| 2024/0177034 A1* | 5/2024 | Jones | | G06N 10/20 |
| 2024/0185110 A1* | 6/2024 | Morino | | G06N 10/00 |

(Continued)

OTHER PUBLICATIONS

Liu, Yong (Alexander) et al., "Closing the "Quantum Supremacy" Gap: Achieving Real-Time Simulation of a Random Quantum Circuit Using a New Sunway Supercomputer," In Proceedings of the International Conference for High Performance Computing, Networking, Storage and Analysis, ACM, ISBN, Article No. 3, Nov. 23, 2021, pp. 1-20.

*Primary Examiner* — David E Choi
(74) *Attorney, Agent, or Firm* — Shook, Hardy & Bacon L.L.P.

(57) ABSTRACT

In various examples, systems and methods for simulation of quantum computing circuits using Kronecker factorization are provided. A partitioned quantum computing circuit may be generated by partitioning the quantum computing circuit using at least one partition boundary with respect to its state vector, to subdivide the quantum computing circuit into a plurality of circuit partitions. Circuit instances may be generated for the circuit partitions, where at least one circuit partition comprises a circuit instance that includes at least one operator derived from a Kronecker factorization that corresponds to a quantum operator that operates using qudits from more than one of the circuit partitions. A representation of at least a component of a state of the state vector for the quantum computing circuit may be generated based at least on simulating the at least one circuit instance for the circuit partitions.

21 Claims, 13 Drawing Sheets

(56) References Cited

U.S. PATENT DOCUMENTS

| | | | |
|---|---|---|---|
| 2024/0311667 A1* | 9/2024 | Jones | G06N 3/044 |
| 2024/0311668 A1* | 9/2024 | Jones | G06N 10/20 |
| 2024/0311673 A1* | 9/2024 | Salim | G06N 3/065 |
| 2025/0028783 A1* | 1/2025 | Babbush | G06F 30/20 |
| 2025/0061360 A1* | 2/2025 | Mozafari Ghoraba | G06N 10/20 |

\* cited by examiner

SIMULATING QUANTUM COMPUTING CIRCUITS USING KRONECKER FACTORIZATION

BACKGROUND

Quantum computing circuits may be considered as analogous to timelines, where at any point on the timeline, qudits of the quantum computing circuit exist in a particular quantum state. Along the timeline, the quantum computing circuit may be represented in terms of individual paths that correspond to a particular qudit of the state vector for the quantum computing circuit. Quantum logic gates (which may be referred to herein simply as a "gate") represent a position along at least one path in the quantum computing circuit system where a quantum operator is executed. Quantum logic gates located along the path for an individual qudit represent a quantum operation performed using and/or on that qudit (and possibly involving other qudits) and that may affect the quantum state of that qudit and/or the quantum state of another qudit. Executing the quantum computing circuit amounts to traversing the circuit along the timeline (e.g., from left to right), while the qudits of the state vector are manipulated based on the quantum logic gates encountered on their respective paths. As such, at any point along the timeline, at a time slice across the individual paths (often represented as a column of the circuit), the state of the state vector represents the cumulative operations performed by quantum logic gates on each qudit from their initial condition to that given point of the timeline along the circuit execution path.

In classical computing, when complex circuitry—such as a graphics processing unit (GPU) or central processing unit (CPU)—is under development, portions of the circuitry may be simulated on a simulation computing platform so the circuit designer can better understand how different design decisions can influence circuit performance. Similarly, designers of quantum computing systems and circuits leverage emulation of quantum computers on simulation computing platforms in order to test different design options to develop better quantum computers and more effective algorithms. When a simulation of a quantum system is performed on a classical computer platform, the classical computer platform is essentially executing emulations of quantum processes. However, a distinct challenge faced with simulating quantum computing systems involves the memory and processing resources of the simulation computing platform needed to accurately emulate, manipulate, and probe the quantum state (and its corresponding state vector) of the quantum system being simulated.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter. Embodiments of the present disclosure relate to simulation of quantum computing circuits using Kronecker factorization.

For example, systems and methods are disclosed that facilitate the development of quantum circuit equivalents, reductions, or models that may be used to represent a more complex quantum computing circuit within a quantum system simulation. In contrast to conventional systems, which may use swapping algorithms or matrix factorization to reformulate the quantum state of a state vector into a generic tensor network, one or more of the embodiments of this disclosure, instead, or additionally, factorize the quantum state of the state vector based on Kronecker products (which may be referred to as Kronecker factorization). Embodiments that use Kronecker factorized states to model a quantum circuit no longer require memory and computing resources that grow exponentially with the number of qudits used by the circuit. The memory required for the simulation computing platform to store the quantum state associated with the circuit may grow more linearly with the number of qudits, dramatically reducing the amount of memory required to simulate large quantum circuits. Additionally or alternatively, Kronecker factorization may be used to generate a reduced representation of a quantum computing circuit by leveraging operator algebra on a site-local operator basis. Note that the Kronecker factorization techniques disclosed herein do not preclude also using other techniques, such as swapping algorithms, during a simulation of the quantum computing circuit.

The process of Kronecker factorization may begin with partitioning of a quantum computing circuit by generating a representation of one or more partition boundaries that subdivide the quantum computing circuit into a plurality of circuit partitions. A circuit partition may include one or more circuit paths for one or more qudits of the state vector. That is, a partition boundary may be established between selected qudits of the state vector starting at an initial state of the state vector (e.g., at an initial time slice on the timeline of the quantum computing circuit) and extending through the quantum computing circuit for a duration of time to a final state of the state vector (e.g., at an ending time slice on the timeline of the quantum computing circuit). As such, a partition boundary may represent a virtual border that separates the individual paths of particular qudits into separate partitions. Quantum logic gates that operate only using qudits within a single circuit partition (e.g., gates that are not cut by a partition boundary) may be referred to herein as conforming gates. Quantum logic gates that bridge a partition boundary and operate on qudits from more than one circuit partition (e.g., gates that are cut by a partition boundary) may be referred to herein as non-conforming gates. As such, the introduction of a partition boundary may cut through a quantum logic gate resulting in one or more of such non-confirming gates. For conforming gates, the quantum operators they execute may be considered well defined because they just operate on the qudits that belong to the partition in which the gate resides. However, for non-conforming gates, the quantum operators they execute involve qudits that have been separated by a partition boundary. Those partitioned qudits may be represented as different qudit objects for different qudits that are isolated from each other by a partition boundary.

Accordingly, in embodiments, in order to account for those quantum operations performed during simulation on qudits by non-conforming gates, the quantum operators of non-conforming gates may be factored along the partition boundary (e.g., using Kronecker factorization) to produce a sum of Kronecker-factorized operators. The resulting Kronecker-factorized operators represent operator factors that may be substituted within the partitions created by the partition boundary, in place of the non-conforming gate, to independently act on the respective qudits of the separate partitions represented as corresponding qudit objects. Individual circuit instances representing a circuit partition may be generated by iteratively evaluating circuit paths for each qudit of the qudit object through the possible permutations of each conforming gate in the partition and operator factors. From each circuit partition, individual new circuit instances may be generated and independently simulated in parallel with each other and/or in parallel with circuit instances of the other circuit partitions. The decomposition of the original quantum computing circuit into separate circuit partitions, each defining one or more circuit instances, may produce qudit objects that may be efficiently represented in memory via the state of the qudit object for each circuit partition.

In some embodiments, a quantum classical compiler may be implemented using the disclosed Kronecker factorization and quantum computing circuit partitioning techniques. The quantum classical compiler may compute computational costs via a runtime evaluation of one or more partitioning candidates. The output of the runtime evaluation may include a report that provides computational cost metrics associated with each of the one or more partitioning candidates, so that a system designer may select which partitioning candidate to use for execution by the simulation computing platform. The report may indicate to the system designer whether a simulation computing platform has feasible resources to execute a simulation of that partition candidate. In some embodiments, the runtime evaluation may further compare the computational cost metrics of different partitioning candidate and automatically select a partitioning candidate to execute, for example based on the lowest computational costs and/or based on the configuration of computing resources available from the simulation computing platform.

For example, in performing the runtime evaluation of partition candidates, the quantum classical compiler may consider the available hardware and runtime frameworks (e.g., software) available for simulating each partition candidate. For each partition candidate, the quantum classical compiler may iteratively compute computational cost metrics quantifying the cost of simulating the partition candidate based on the available combinations of software and hardware, and determine the configuration that provides the optimal computational cost metrics (e.g., the configuration that results in the lowest computational costs to execute that partition candidate). The quantum classical compiler may iteratively loop through possible configurations until a configuration that meets computational cost metrics given a specified use parameter (e.g., a configuration that uses no more than a specified amount of memory and/or that meets a maximum simulation execution time) is found. When a partition candidate that meets a computational costs metric threshold, that partition candidate may be selected for processing and simulation by the simulation computing platform as described herein. Computational cost metrics and/or memory requirements may be determined as a function of the number of nonconforming gates and/or number of partitions a partition candidate comprises.

BRIEF DESCRIPTION OF THE DRAWINGS

The present systems and methods for simulation of quantum computing circuits using Kronecker factorization are described in detail below with reference to the attached drawing figures, wherein.

DETAILED DESCRIPTION

Figure 1:
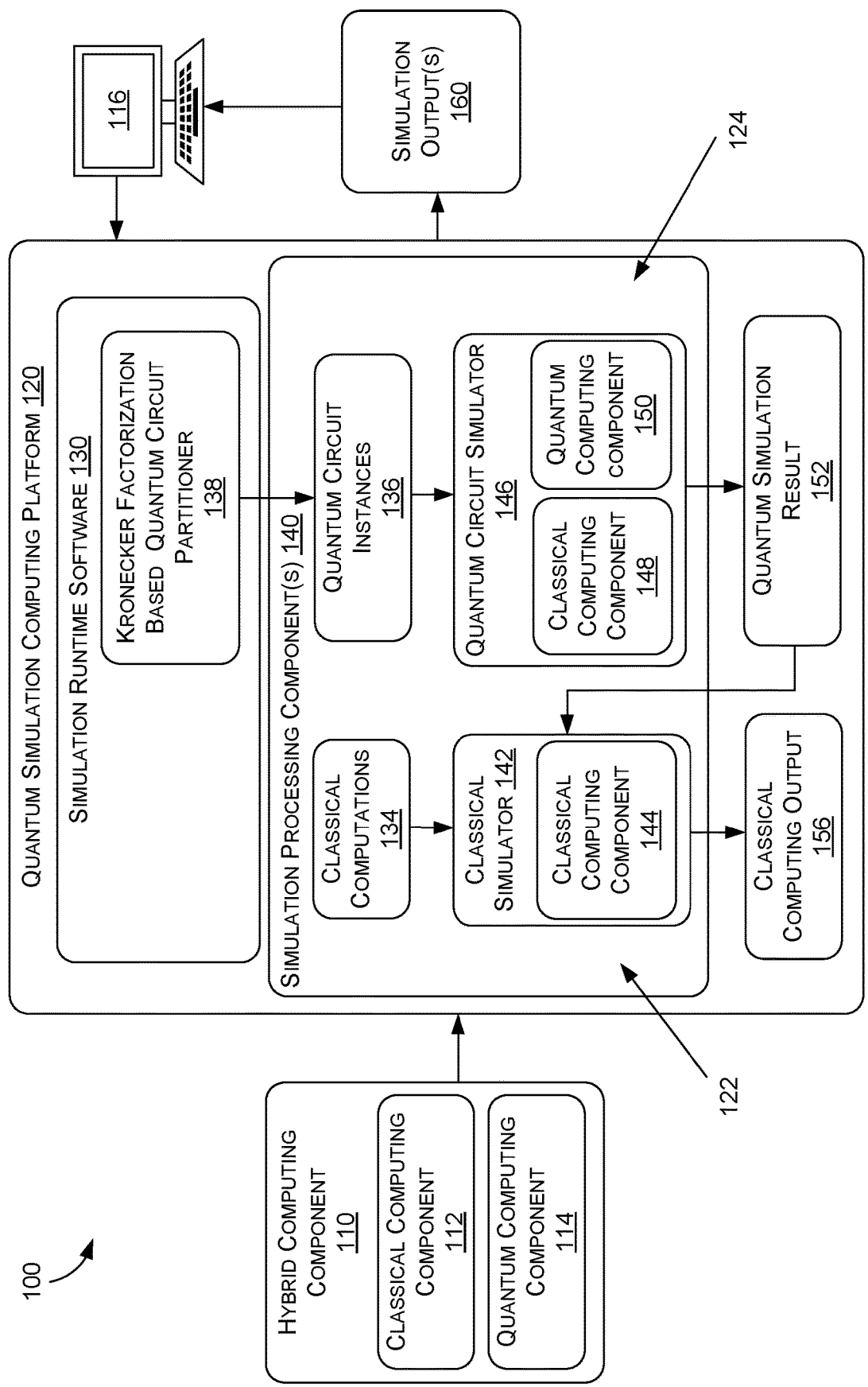
FIG. 1 is an illustration of an example flow diagram for a quantum simulation computing platform, in accordance with some embodiments of the present disclosure.

Systems and methods are disclosed related to simulation of quantum computing circuits using Kronecker factorization. The present disclosure relates to simulation of quantum computing circuits. More specifically, the systems and methods presented in this disclosure facilitate the development of quantum circuit equivalents, reductions, or models, that may be used to represent a more complex quantum computing circuit within a quantum system simulation. A distinct challenge faced with simulating quantum computing systems involves the memory and processing resources of the simulation computing platform needed to accurately emulate, manipulate, and probe, the quantum state (and its corresponding state vector) of the quantum system being simulated. Quantum states may be modelled as complex state vectors in a Hilbert space having a length of 1. To accurately represent and manipulate these complex state vectors, the memory requirements of a simulation computing platform scale exponentially as a function of the number of qudits that make up the state vector.

As the term is used herein, a qudit may refer to a basic unit of quantum information described by a superposition of a plurality of states. For example, a qubit is a form of qudit that describes a superposition of two states. Other forms of qudits may describe, for example a superposition of three states, four states, five states, or any other number of states. Embodiments disclosed herein are not limited to any one form of qudit. Examples and descriptions described herein in terms of qubits are provided as non-limiting illustrations applicable to embodiments that use qubits and/or any qudits that comprise any plurality of states.

While a quantum computing circuit may have a state vector on the order of several hundreds of qudits, the largest quantum computing circuits simulated to date can only process state vectors on the order of a 10×10 qudit grid, with a circuit depth of about 40. As such, while quantum computing holds the potential for solving highly complex algorithms (for example, the Variational Quantum Eigensolver to find very precise estimates of energy structures in various molecular systems, or quantum encryption-based communication applications) there are barriers at the developmental stages for designing and testing those quantum computing circuits due to the limitations of current simulation technologies.

In a quantum computing circuit, each qudit of the state vector is operated upon (e.g., manipulated) according to one or more quantum logic gates positioned along a circuit path for that qudit. A quantum logic gate (which may be referred to herein simply as a "gate") represents a position along at least one path in the quantum computing circuit system where a quantum operator is executed. Quantum logic gates may be represented mathematically by unitary matrices. For example, a gate which acts on n qubit may be represented by a $2^n \times 2^n$ unitary matrix. Examples of quantum logic gates include, but are not limited to, identity gates, Pauli gates, controlled gates, phase shift gates, Hadamard gates, swap gates, Toffolio gates and Deutsch gates.

Quantum computing circuits may be considered as analogous to timelines, where at any point on the timeline, qudits of the quantum computing circuit exist in a particular quantum state. Along the timeline, the quantum computing circuit may be represented in terms of individual paths that correspond to a particular qudit of the state vector for the quantum computing circuit. A quantum logic gate (which may be referred to herein simply as a "gate") represents a position along at least one path in the quantum computing circuit system where a quantum operator is executed. Quantum logic gates located along the path for an individual qudit represent a quantum operation performed using that qudit (and possibly involving other qudits) that may affect the quantum state of that qudit and/or the quantum state of another qudit. Executing the quantum computing circuit amounts to traversing the circuit along the timeline (e.g., from left to right), while the qudits of the state vector are manipulated based on the quantum logic gates encountered on their respective paths. As such, at any point along the timeline, at a time slice across the individual paths (often represented as a column of the circuit) the state of the state vector represents the cumulative operations performed by quantum logic gates on each qudit from their initial condition to that given point of the timeline along the circuit execution path. The "depth" of an individual qudit's circuit path describes the number of gates that operate on that qudit as the quantum computing circuit is executed. A quantum operation performed by a gate may involve just a single qudit, or involve multiple qudits. Moreover, quantum operation may manipulate the state of one qudit based on the state of another qudit. The state vector at any given point along the execution path of a quantum computing circuit thus represents the cumulative operations performed by gates on each qudit of the state vector from their initial condition to that given point along the circuit execution path.

Swapping algorithms represent one existing technology that can be leveraged within simulations to collate operator access to a quantum state vector. However, the application of such swapping algorithms to quantum computing circuits may be complicated as the number of qudits increases. At some system size, the runtime of the swapping algorithm on the simulation computing platform will become dominated by the movement of data as the state vector grows exponentially. Other existing technologies include work involving generic tensor networks and matrix factorization techniques that trade memory for computational complexity by introducing a number of intermediate indices (e.g., modes) which are contracted over to compute various measures of the quantum state. For example, a general flow of a circuit path optimization process may include initial pathfinding, followed by interleaved loops of slicing and reconfiguration until contraction criteria in a hyper-optimization loop are satisfied. The circuit path may be computed using heuristics; however, there is no efficient algorithm to find the circuit's best path, and so path candidates are evaluated based on memory requirements and computational cost. The computational cost can vary by orders of magnitude with different paths, making effectiveness of such techniques highly dependent on the effectiveness of the optimization loops.

In contrast to these existing technologies, with one or more of the embodiments of this disclosure, rather than (or in addition to) using swapping algorithms or matrix factorization to reformulate the quantum state into a generic tensor network, the quantum state may be factorized into a sum of Kronecker products. That is, the initial condition to a quantum state may be represented by a product state by precisely specifying the single qubit states and constructing an aggregate state through a Kronecker product. As an illustrative example, a quantum system of n d-level quantum states in a product state may be represented as follows:

$$|\psi\rangle = |\phi\rangle_0 \otimes |\phi\rangle_1 \otimes |\phi\rangle_2 \ldots \otimes |\phi\rangle_{n-1}$$

where $|\phi\rangle_i$ is a single-qudit state associated with the i-th site, or more formally:

$$|\phi\rangle_i = a_j^{(i)} |j\rangle$$

where $a_j^{(i)} \in \mathbb{C}$ and $|j\rangle$ is a single-site basis state. Generally speaking, the quantum state vector comprises a list of coefficients that specify the weights of the individual product states. Moreover, any arbitrary state may be represented with a sum of product states so that the state $|\Psi\rangle$ may be represented as:

$$|\Psi\rangle = \sum_i \alpha_i |\psi\rangle_i = \sum_i \alpha_i \left[ \bigotimes_{j=0}^{n-1} |\phi\rangle_j^{(i)} \right]$$

where the $\alpha_i$ coefficients correspond with the probabilities of a particular product state configuration. Because $|\psi\rangle$ is a product state, there are $d^n$ of the $\alpha_i$ coefficients. However, by formulating the quantum state as a superposition of Kronecker factorized states, for example by fusing $|\phi\rangle_0$ and $|\phi\rangle_1$ to form a first Kronecker factorization of two sites, fusing $|\phi\rangle_2$ and $|\phi\rangle_3$ to form a second Kronecker factorization of two sites, and so on, the quantum state $|\Psi\rangle$ may be represented using fewer than $d^n$ coefficients. In other words, the Kronecker factorizations may be used to map the quantum state vector to a sum of Kronecker factorized states with size $md^k$, as opposed to size $d^n$. In this case, m is the number of Kronecker factorized states with at most k sites fused. The number of Kronecker factorized states in the result may grow with the depth of the quantum computing circuit. The depth-dependent growth will vary as a function of the quantum computing circuit in question.

With embodiments that use Kronecker factorized states to model a quantum circuit, there is no longer the need for a number of $\alpha_i$ coefficients that grows exponentially with to system size. The memory required for a simulation computing platform to store the quantum state associated with the quantum circuit grows more linearly with the number of qudits, dramatically reducing the amount of memory required to simulate large quantum circuits. Additionally or alternatively, Kronecker factorization may be used to generate reduced representations of the quantum computing circuit by leveraging operator algebra on a site-local operator basis. The Kronecker factorization techniques disclosed herein do not preclude also using other techniques, such as swapping algorithms, during a simulation of the quantum computing circuit.

In embodiments, the process of Kronecker factorization begins with partitioning of a quantum computing circuit by defining one or more partition boundaries with respect to a qudit array representing the quantum computing circuit's state vector (e.g., representing the qudits in the circuit and one or more values representing their corresponding state). The partition boundaries operate to subdivide the quantum computing circuit into a plurality of circuit partitions each comprising one or more circuit paths for one or more qudits. That is, a partition boundary is established between selected qudits of the state vector starting at an initial state of the state vector (e.g., at an initial time slice on the timeline of the quantum computing circuit), and extends through the quantum computing circuit for at duration of time to a final state of the state vector (e.g., at an ending time slice on the timeline of the quantum computing circuit).

The partitioned subset of qudits of the state vector that fall within a circuit partition defines a qudit object for that partition. For example, if the qudit array for the state vector of the quantum computing circuit comprises qudits $q_0$, $q_1$, $q_2$, $q_3$, the quantum computing circuit may be cut (partitioned) by defining a partition boundary between $q_0$, $q_1$ and $q_2$, $q_3$. A qudit object Q01 may then correspond to circuit partition 0 that comprises circuit paths for $q_0$, $q_1$ and a qudit object Q23 may then correspond to circuit partition 1 that comprises circuit paths for $q_2$, $q_3$.

As previously mentioned, a quantum operation performed by a gate may involve just a single qudit or may involve multiple qudits, according to one or more embodiments. Partitioning the quantum computing circuit may therefore result in instances where some gates operate only on qudits within a circuit partition, and other instances of other gates that operate on qudits across a partition boundary. Gates that operate only using qudits within a single circuit partition may be referred to herein as conforming gates. Gates that bridge a partition boundary and operate on qudits from more than one circuit partition may be referred to herein as non-conforming gates. The introduction of a partition boundary may cut through a quantum logic gate, resulting in one or more of such non-confirming gates. For conforming gates, the quantum operators that are executed may be considered well defined because they operate on the qudit object of that partition. However, for non-conforming gates, the quantum operators that are executed may involve qudits that have been separated into different qudit objects that are isolated from each other by a partition boundary.

Accordingly, in embodiments, non-conforming gates quantum operators may be factored along the partition boundary (e.g., using Kronecker factorization) to produce a sum of Kronecker-factorized operators that comprise operators that independently act on the respective qudit objects of the separate partitions. The resulting Kronecker-factorized operators represent operator factors that may be substituted within the partitions created by the partition boundary, in place of the non-conforming gate, to independently act on the respective qudit objects of the separate partitions.

For example, a non-conforming gate of the original quantum computing circuit that operates on qudits $q_1$ and $q_2$ may be factored to produce a sum of Kronecker-factorized operators that include a first operator that acts on a first qudit object (which may be referred to as $Q_{01}$) and a second operator that acts on a qudit object (which may be referred to as $Q_{23}$). Moreover, the sum of Kronecker-factorized operators comprises a sum of i factors (e.g., a factor corresponding to each of the qudits of the state vector) where each factor may be a Kronecker product. For example, the first Kronecker-factorized operator that acts on the qudit object $Q_{01}$ may include i=4 operator factors corresponding to each of $q_0$, $q_1$, $q_2$, $q_3$, and the second Kronecker-factorized operator that acts on the qudit object $Q_{23}$ may include i=4 operator factors corresponding to each of $q_0$, $q_1$, $q_2$, $q_3$. Individual circuit instances representing a circuit partition may be generated by iteratively evaluating circuit paths for each qudit of the qudit object through the possible permutations of each conforming gate and operator factors (for each non-conforming gate) present within the circuit partition. In this way, each circuit partition produced by the introduction of partition boundaries constitutes individual new circuit instances which may be independently simulated in parallel with each other and/or in parallel with circuit instances of the other circuit partitions. The decomposition of the original quantum computing circuit into separate circuit partitions, each defining one or more circuit instances, produces a scenario that respects the Kronecker-factorization schema and may be efficiently represented in memory via the state of the qudit object for each circuit partition.

In some embodiments, the circuit paths of circuit instances for one or more of the circuit partitions may be mapped to a multiway system where each of the circuit paths may be computed in parallel by one or more processors such as, but not limited to, a GPU. The circuit simulation may comprise traversing each of the circuit paths mapped to the multiway system and caching intermediates produced from the execution of each path. The intermediates may be accumulated to form a result representative of probing at least a portion of the state of the original quantum computing circuit (e.g., to obtain the expectation value of the original quantum computing circuit, sample one or more product states of the final state, and/or compute a norm of the final state). In some embodiments, the simulation result (e.g., representation of at least a component of a final or non-final state of the original quantum computing circuit) may be computed from a Kronecker product of intermediates from each or the circuit partitions. From the simulation result, the simulation may extract at least one component of one or more product states of the quantum computing circuit.

In some embodiments, partitioning of the quantum computing circuit by one or more partition boundaries may be performed using an initial partitioning algorithm executed by the simulation computing platform, or executed using a pre-simulation partitioning algorithm that produces circuit partitions for input to the simulation computing platform. Partitioning may be performed by the partitioning algorithm based on specifying parameters (such as target or maximum qudit group sizes, a target or maximum number of circuit partitions, for example), and the partitioning algorithm may generate permutations of possible partitions given the parameters. In some embodiments, the partitioning algorithm may vary the order of state vector qudits when determining the permutations of possible partitions based on the specified parameters. In some embodiments, the partitioning algorithm may favor identifying circuit partitions that satisfy the specified parameters while minimizing the creation of non-conforming gates per partition, since computational complexity is at least in part a function of the number of partition boundaries that result in non-conforming gates. In some embodiments, the specified parameters to the partitioning algorithm may prescribe the number of circuit partitions to be formed, which may be useful to provide a partitioning that will execute within a target memory profile (for example, where fitting the target memory profile is more important than minimizing simulation execution time).

In some embodiments, a Quantum Classical Compiler may be implemented using the disclosed Kronecker factorization and quantum computing circuit partitioning techniques. The Quantum Classical Compiler may compute computational costs via a runtime evaluation of one or more partitioning candidates. The output of the runtime evaluation may include a report that provides computational cost metrics associated with each of the one or more partitioning candidates, so that a system designer may select which partitioning candidate to use for execution by the simulation computing platform. The report may indicate to the system designer whether a simulation computing platform has feasible computing resources to execute a simulation of that partition candidate. In some embodiments, the runtime evaluation may further compare the computational cost metrics of different partitioning candidate and automatically select a partitioning candidate to execute, for example based on the lowest computational costs and/or based on the configuration of computing resources available from the simulation computing platform.

For example, in performing the runtime evaluation of partition candidates, the Quantum Classical Compiler may consider the available hardware and runtime frameworks (e.g., software) available for simulating each partition candidate. For each partition candidate, the Quantum Classical Compiler may iteratively compute computational cost metrics for simulating the partition candidate based on the available combinations of software and hardware and determine the configuration providing the optimal computational cost metrics (e.g., the configuration that results in the lowest computational costs to execute that partition candidate). In some embodiments, the Quantum Classical Compiler may iteratively loop through possible configurations until a configuration is found that meets computational cost metrics given a specified use parameter (e.g., a configuration that uses no more than a specified amount of memory and/or that meets a maximum simulation execution time). In some embodiments, when a partition candidate that meets a computational costs metric threshold, that partition candidate may be selected for processing and simulation by the simulation computing platform as described herein. In some embodiments, computational cost metrics and/or memory requirements may be determined as a function of the number of nonconforming gates and/or number of partitions a partition candidate comprises.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is a data flow diagram illustrating an example quantum simulation computing platform 120, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to, or instead of, those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example computing device 1000 of FIG. 10, and/or example data center 1100 of FIG. 11.

The process 100 may include generating and/or receiving a hybrid computing component 110 using a quantum simulation computing platform 120 that may include at least one quantum computing component 114 (such as a quantum computing circuit or algorithm, for example). In some embodiments, such as the embodiment shown in FIG. 1, the hybrid computing component 110 may further include a classical computing component 112 (e.g., software code for execution on a non-quantum processor such as a central processing unit (CPU), or graphics processing unit (GPU), or other classical processing unit). In this context, the hybrid computing component 110 may be referred to as a hybrid algorithm. In some embodiments, the hybrid computing component 110 may at least in part comprise hardware description language (HDL) code that describes the structure and/or behavior of a circuit (either classical, quantum, or a combination thereof) to be simulated by the quantum simulation computing platform 120. As shown in FIG. 1, the quantum simulation computing platform 120 comprises simulation runtime software 130 (to initiate and control the execution of simulations based on the hybrid computing component 110) and one or more simulation processing components 140 (which are the underlying processing units that execute the simulation based on the hybrid computing component 110). The quantum simulation computing platform 120 may be used for processing (e.g., compiling and/or executing) a quantum circuit. In some embodiments, the quantum simulation computing platform 120 may be used for performing a quantum state preparation.

In some embodiments, a user device 116 comprising a human machine interface (HMI) may be coupled to the quantum simulation computing platform 120 to interface with the simulation runtime software 130 to control and/or monitor one or more aspects of a simulation. In some embodiments, the quantum simulation computing platform 120 may generate one or more simulation outputs 160 for display at the user device 116 based on the hybrid computing component 110. In some embodiments, the user device 116 may comprise a network node coupled to the quantum simulation computing platform 120 via one or more networks, such as but not limited to those described herein. Moreover, the quantum simulation computing platform 120 may, at least partly, be hosted using one or more cloud-based platforms and may communicate over one or more networks, such as but not limited to those described herein.

In some embodiments, the quantum simulation computing platform 120 may generate a global simulation that simulates a virtual world or environment (e.g., a simulated environment) that may include artificial intelligence (AI) vehicles or other objects (e.g., pedestrians, animals, etc.), hardware-in-the-loop (HIL) vehicles or other objects, software-in-the-loop (SIL) vehicles or other objects, and/or person-in-the-loop (PIL) vehicles or other objects. One or more outputs from the global simulation may be presented by the user device 116. The global simulation may be maintained within an engine (e.g., a game engine), or other software-development environment, that may include a rendering engine (e.g., for 2D and/or 3D graphics), a physics engine (e.g., for collision detection, collision response, etc.), sound, scripting, animation, AI, networking, streaming, memory management, threading, localization support, scene graphs, cinematics, and/or other features.

The simulation processing component(s) 140 may include any number of CPU(s), GPU(s), Quantum Processing Unit(s) (QPU(s)), quantum computing resources, and/or a combination thereof. In some embodiments, the simulation processing component(s) 140 may be bifurcated into a classical simulation path 122 and a quantum simulation path 124. In some embodiments, the simulation processing component(s) 140 may comprise the quantum simulation path 124 without the classical simulation path 122. For example, in some embodiments classical simulation path 122 may comprise a classical simulator 142 that comprises one or more classical computing components 144 (e.g., CPU(s), GPU(s), or other processing units) that execute simulations (which may comprise at least in part a circuit simulation) based on classical computations 134. When the hybrid computing component 110 includes a classical computing component 112, the simulation runtime software 130 applies the one or more classical computations 134 (obtained or derived from the classical computing component 112) to the classical computing components 144 for execution. The classical computing component(s) 144 execute the classical algorithm(s) 134 to generate classical computing output 156.

In some embodiments quantum simulation path 124 may comprise a quantum circuit simulator 146 that may include computing resources to execute quantum circuit simulations (e.g., one or more simulations of the execution of quantum algorithms on a quantum processor). The quantum circuit simulator 146 may comprise computing resources that include one or more classical computing components 148 (e.g., CPU(s), GPU(s), or other processing units) that execute quantum circuit simulation algorithms based on quantum circuit instances 136 derived from the quantum computing component 114 of hybrid computing component 110. The classical computing components 148 and classical computing components 144 may be implemented using either shared processing resources, or distinct processing resources.

In some embodiments, the quantum circuit simulator 146 may comprise computing resources that include one or more classical computing components 148 (e.g., CPU(s), GPU(s), or other processing units) and/or a quantum computing component 150 (e.g., a QPU and/or other quantum computing resource) that execute quantum circuit simulations based on quantum circuit instances 136 derived from the quantum computing component 114 of hybrid computing component 110. The quantum circuit simulator 146 may processes the quantum circuit instances 136 to compute an output comprising a quantum simulation result 152. The quantum simulation result 152 may be a representation of at least a component of a state of the state vector (e.g., a final or non-final state) for the quantum computing circuit (e.g., quantum computing component 114). For example, the quantum simulation result 152 may include, but is not limited to, an expectation value of the original quantum computing circuit, a sample representing at least a portion of one or more product states of the state vector, a measurement of a quantum state, and/or a norm or other statistics representative of at least a component of the state. The quantum simulation result 152 may comprise measurements of a state of one or more qubits, and/or one or more qudits.

In some embodiments, the quantum simulation result 152 may be read as an input by the classical simulator 142 and used in the process of computing the classical computing output 156. The simulation output(s) 160 generated by processing of the hybrid computing component 110 using the quantum simulation computing platform 120 may comprise the quantum simulation result 152 and/or the classical computing output 156.

As previously mentioned, when a simulation of a quantum system is run on a classical computer platform, the classical computer platform is essentially executing emulations of quantum processes. That said, a distinct challenge faced with simulating quantum computing systems (e.g., q quantum computing circuits) involves the memory and processing resources of the simulation computing platform needed to accurately emulate, manipulate, and probe, the quantum state (and its corresponding state vector) of the quantum system being simulated. Accordingly, as shown in FIG. 1, the simulation runtime software 130 may further comprise a Kronecker factorization based quantum circuit partitioner 138 that generates one or more quantum circuit instances 136 based on the quantum computing component 114. As discussed in further detail herein, the quantum circuit instances 136 may comprise a set of quantum circuit equivalents that may be used to represent a more complex quantum computing circuit described by quantum computing component 114 in order to compute the quantum simulation result 152 in the context of a quantum system simulation.

Figure 2:
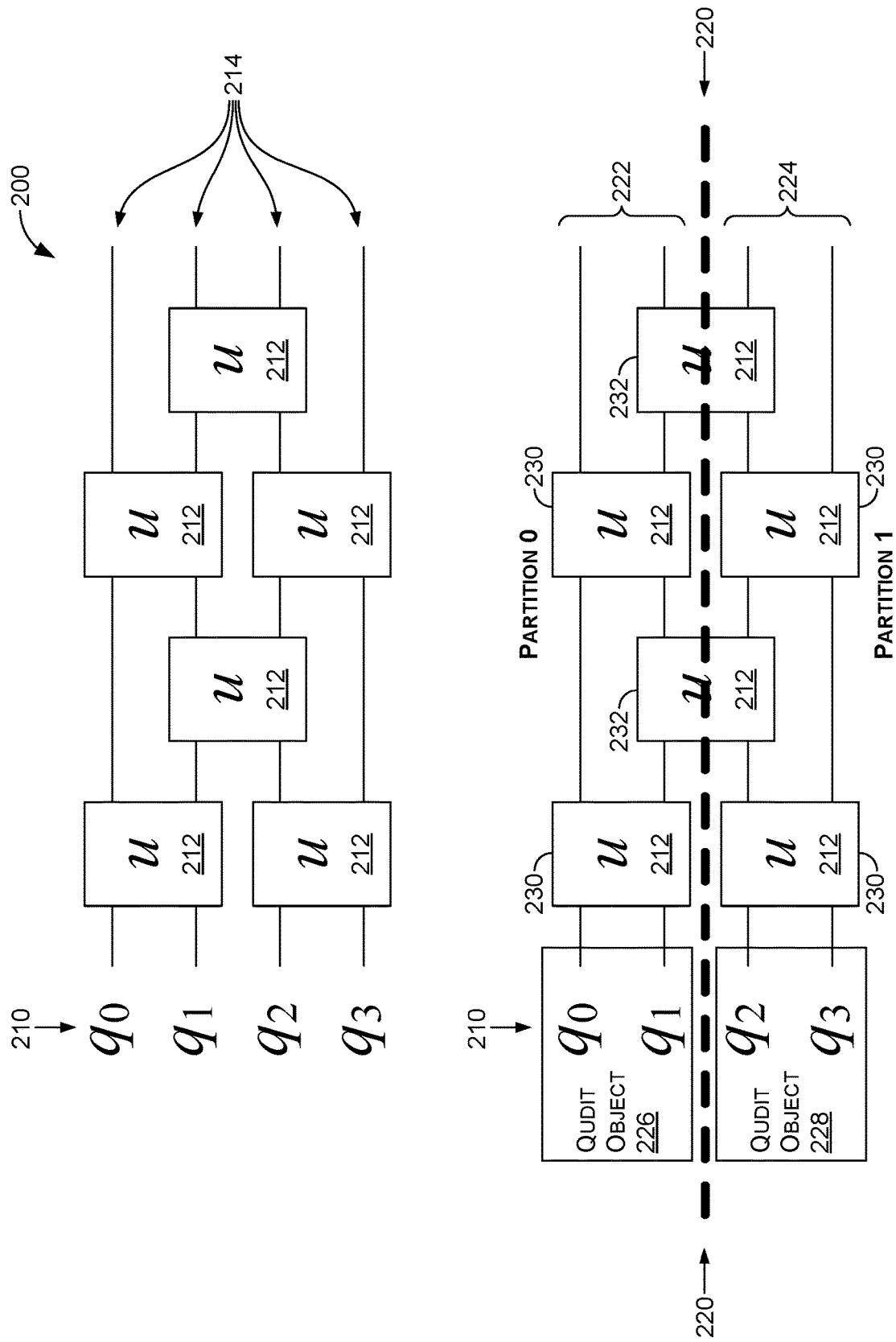
FIG. 2 is an illustration of an example of partitioning of a quantum computing circuit, in accordance with some embodiments of the present disclosure.

Kronecker factorization based quantum circuit partitioner 138 may generate the one or more quantum circuit instances 136 based on partitioning of a quantum computing circuit (e.g., quantum computing component 114) and applying Kronecker factorization. Referring to FIG. 2, an example quantum computing circuit is shown at 200. Quantum computing circuit 200 as illustrated in the example of FIG. 2 comprises a four-qudit array state vector 210 comprising qudits $q_0$, $q_1$, $q_2$, $q_3$. In other embodiments, the quantum computing circuit 200 may comprise a state vector 210 having a greater or few number of qudits. As the example quantum computing circuit 200 is executed, each of the qudits $q_0$, $q_1$, $q_2$, $q_3$ is operated on according to one or more quantum operators 212 positioned along the circuit path 214 for a respective qudit. It should be noted that the state vector 210 and particular configuration of quantum operators 212 and circuit paths 214 shown in FIG. 2 (and further illustrated with respect to FIGS. 3-6) are provided for the purpose of illustrating partitioning and factorization of an example quantum computing circuit, and are not limiting features of embodiments of this disclosure. Embodiments may be applied to other quantum computing circuits having state vectors, quantum operators and circuit path configurations differing from those shown in these figures. A quantum operation performed by a quantum operator 212 may involve just a single qudit, or involve multiple qudits. Moreover, a quantum operator 212 may manipulate the state of one qudit based on the state of another qudit. The state vector 210 at any given point along the execution path of the quantum computing circuit 200 may represents the cumulative operations performed by quantum operator 212 on each qudit of the state vector 210 from their initial condition to that given point along the circuit execution paths 214. The "depth" of a qudit's circuit path 214 may be based on the number of quantum operators 212 that operate on that qubit as the quantum computing circuit 200 is executed.

The process of Kronecker factorization of the quantum computing circuit 200 begins with partitioning of the quantum computing circuit 200 by defining one or more partition boundaries 220 with respect to a qudit array for the state vector 210. A partition boundary 220 may be used to subdivide the quantum computing circuit 200 into a plurality of circuit partitions (e.g., partition 0 shown at 222 and partition 1 shown at 224) each partition comprising one or more circuit paths 214. The partitioned subset of the initial qudit array of the state vector 210 that falls within a circuit partition may define a qudit object for that partition. For example, qudit object 226 may correspond to circuit partition 0 which comprises circuit paths for qudits $q_0$, $q_1$. Qudit object 226 may correspond to circuit partition 1 that comprises circuit paths for qudits $q_2$, $q_3$.

As illustrated in FIG. 2, partitioning the quantum computing circuit 200 may result in instances where some quantum operators 212 (such as those shown at 230) operate only on qudits within their circuit partition, and other instances of other quantum operators 212 (such as those shown at 232) that operate on qudits across a partition boundary 220. Quantum operators 212 that operate only using qudits within a single circuit partition may be referred to herein as conforming quantum operators 230. Quantum operators 212 that bridge a partition boundary 220 and operate on qudits from more than one circuit partition may be referred to herein as non-conforming quantum operators 232. For conforming quantum operators 230, the quantum operation they perform operates on the respective qudit object corresponding to that partition and therefore may remain well defined within the context of that partition. However, for non-conforming quantum operators 232, the quantum operations they perform execute are not well defined because they rely at least in part on qudits belonging to different qudit objects that are isolated from each other by the partition boundary 220.

Figure 3:
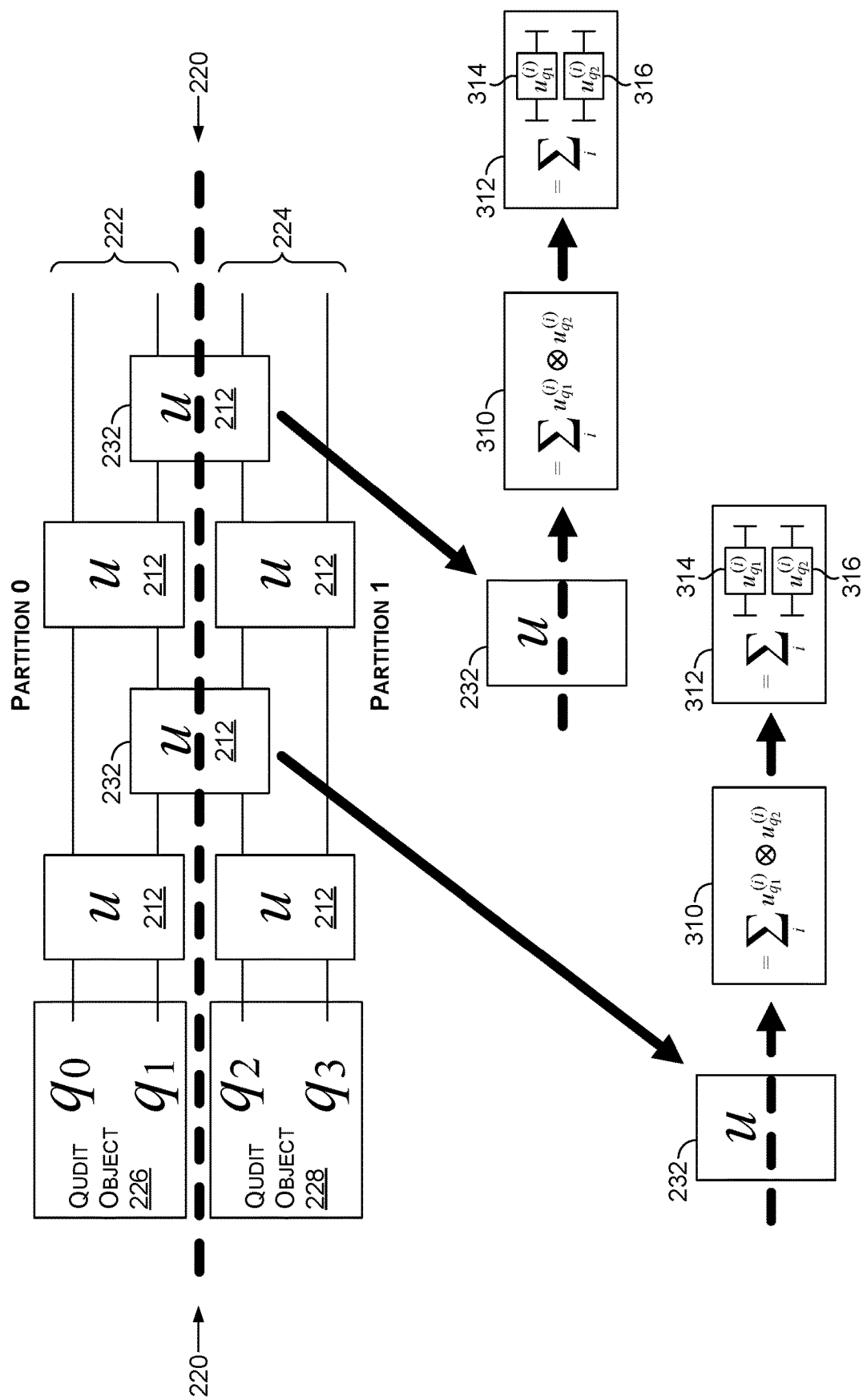
FIGS. 3 and 4 are illustrations of an example of Kronecker factorization of a partitioned quantum computing circuit, in accordance with some embodiments of the present disclosure.

As shown in FIG. 3, each of the non-conforming quantum operators 232 may be factored along the partition boundary 220 to produce a sum of Kronecker-factorized operators (shown at 310). The Kronecker-factorized operators 310 may further be represented as a sum of parallel quantum operators 312 (corresponding to the Kronecker factors of the Kronecker-factorized operators 310) that independently act on the respective qudit objects for their respective separate partitions. In the example of FIG. 3, a non-conforming quantum operators 232 of the original quantum computing circuit 200 that operates on qudits $q_1$ and $q_2$ may be factored to produce a sum of Kronecker-factorized operators 310 that may be represented as a first quantum operator 314 that acts on the qudit object 226 (for partition 0) and a second quantum operator 316 that acts on the qudit object 228 (for partition 1).

Figure 4:
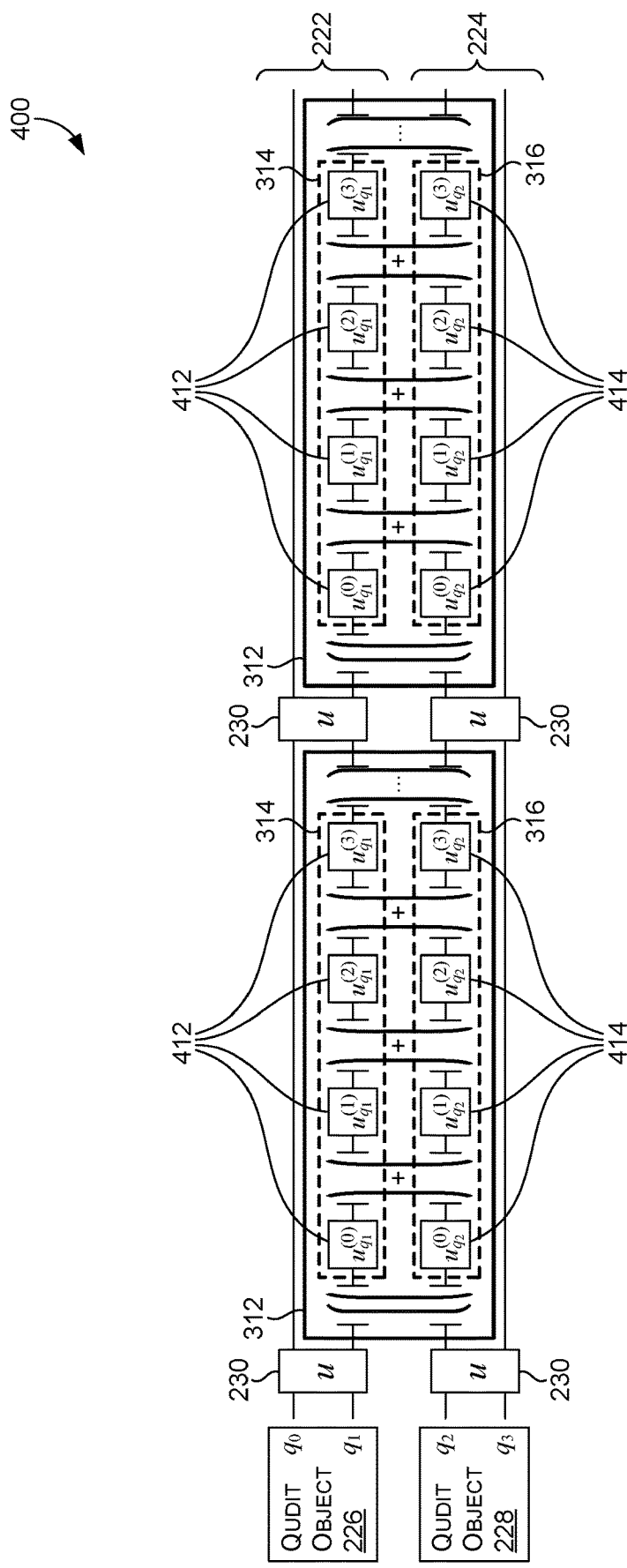

Referring now to FIG. 4, FIG. 4 illustrates a Kronecker-factorized equivalent circuit structure 400 corresponding to the quantum computing circuit 200. The Kronecker-factorized operators 310 comprises a sum of i factors (e.g., a factor corresponding to each of the qudits of the state vector) where each factor may itself be represented as a Kronecker product. Accordingly, the first quantum operator 314 and second quantum operator 316 may each be expanded (as illustrated in FIG. 4) and substituted in each partition in place of the non-conforming quantum operators 232. For example, as shown in FIG. 4, the first quantum operator 314 of a Kronecker-factorized operator 310 acts on the qudit object 226 and may be expanded to a plurality of i operator factors 412 (where i=4 in this example, corresponding to each of $q_0$, $q_1$, $q_2$, $q_3$). The second quantum operator 316 of a Kronecker-factorized operator 310 acts on the qudit object 228 and may similarly be expanded to i=4 operator factors 414 (corresponding to each of qudits $q_0$, $q_1$, $q_2$, $q_3$).

Figure 5A:
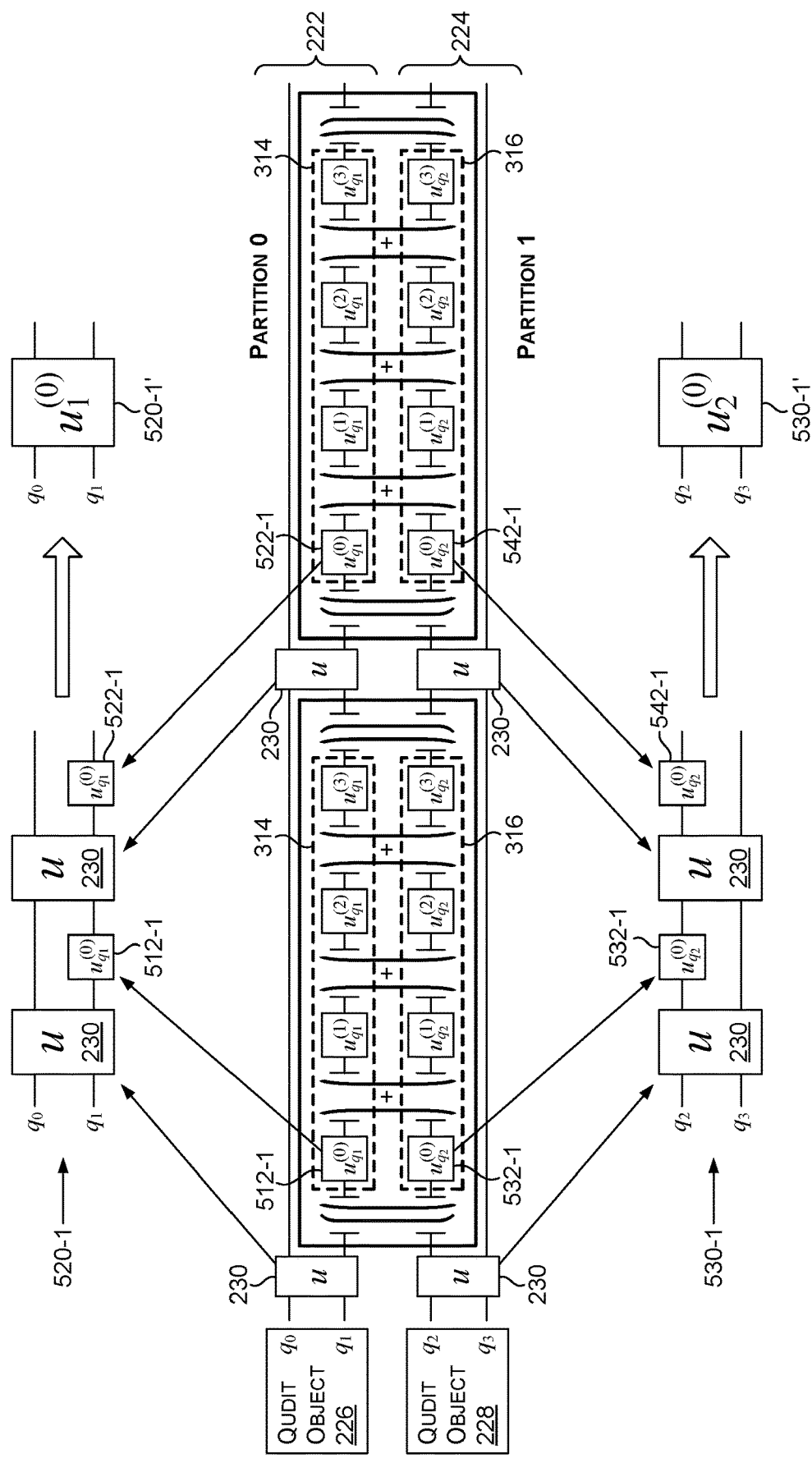
FIGS. 5A, 5B and 5C are illustrations of generating quantum circuit instances based on Kronecker factorization of a partitioned quantum computing circuit, in accordance with some embodiments of the present disclosure.
Figure 5B:
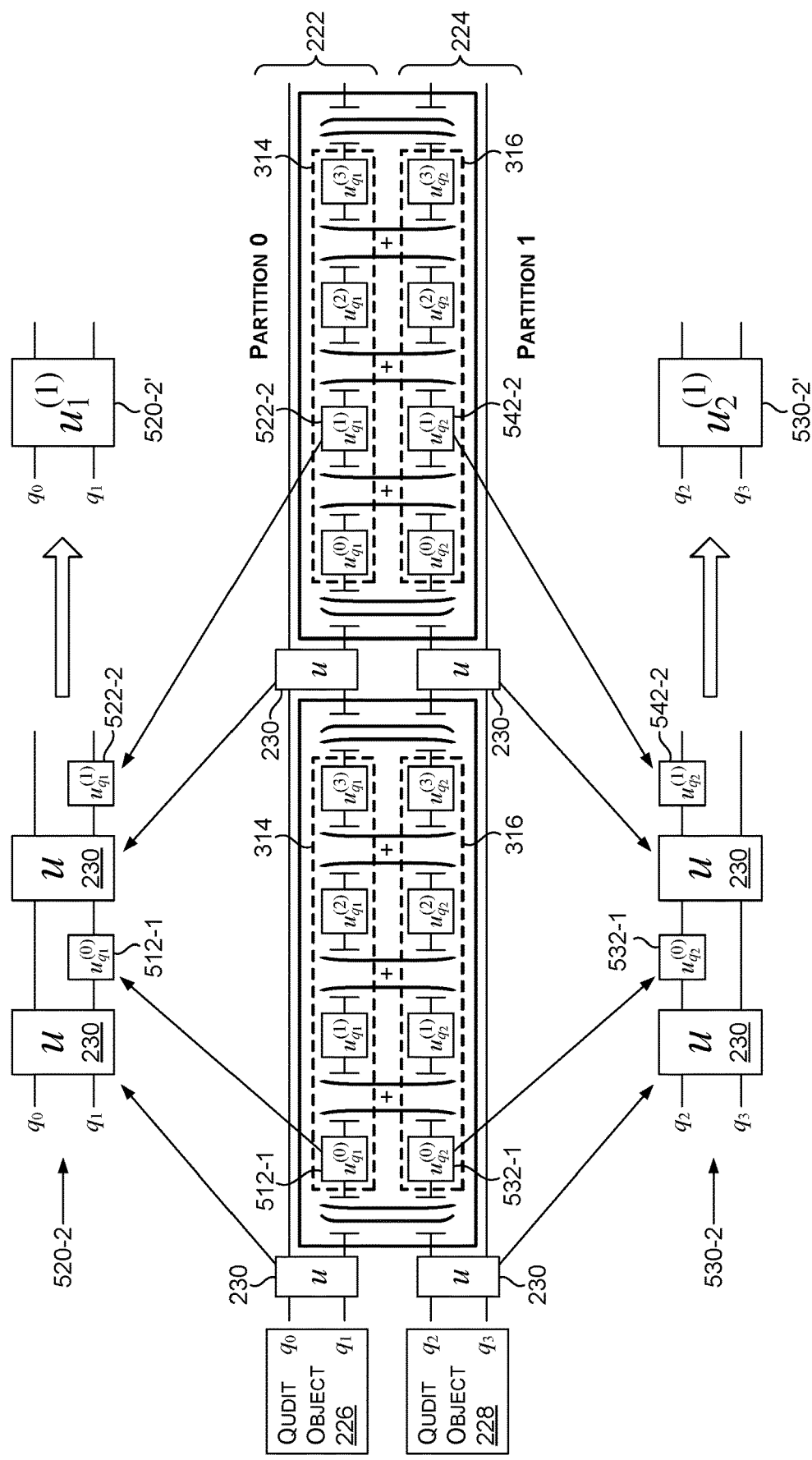
Figure 5C:
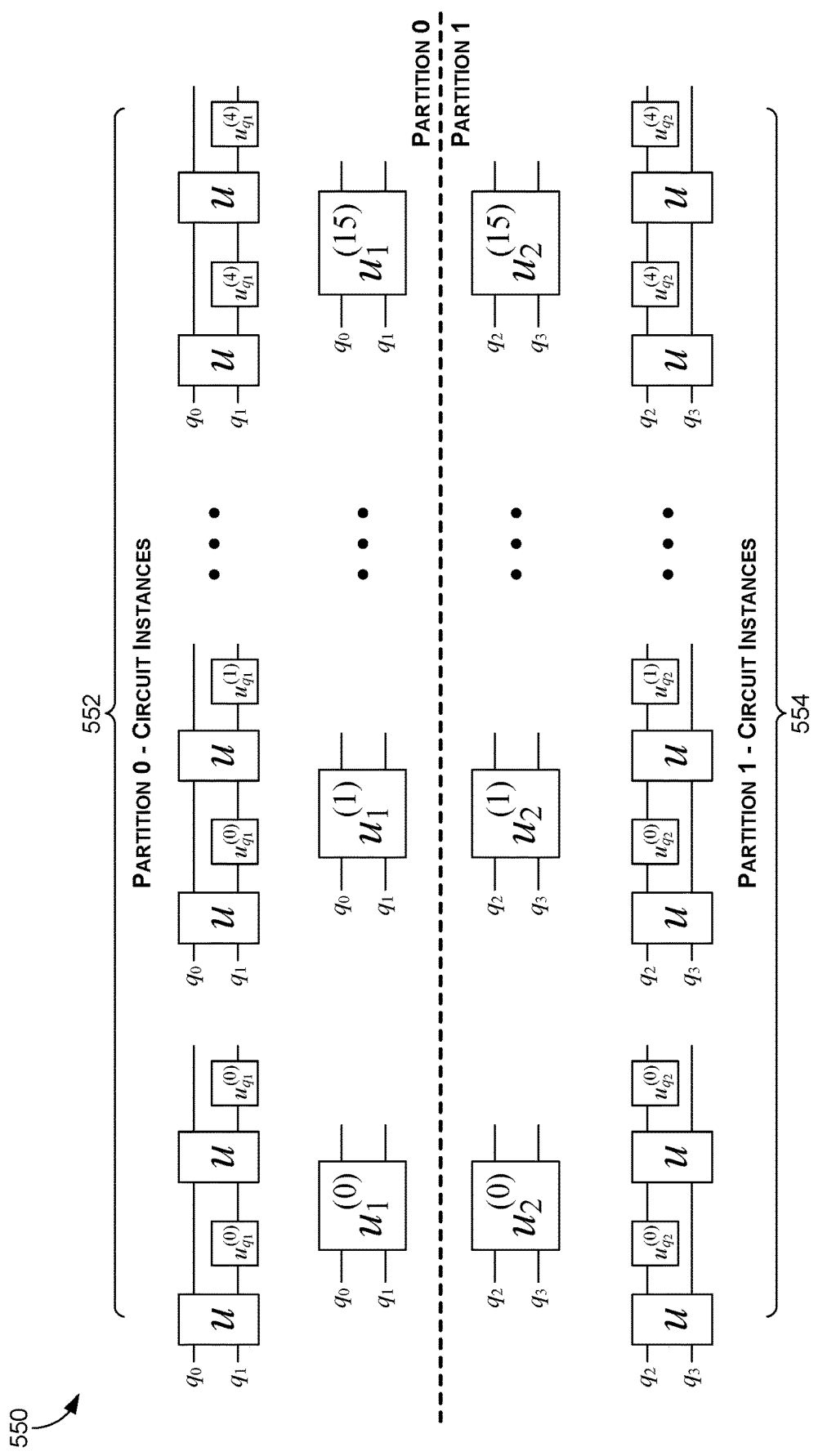

Given this Kronecker-factorized equivalent structure 400, a plurality of individual quantum circuit instances 136 within partition 0 (222) and partition 1 (224) may be generated as shown in FIGS. 5A to 5C by iteratively evaluating circuit paths for each qudit of the respective qudit objects 226 and 228 through the permutations of each conforming quantum operator 230 and operator factor 412, 414 present within a circuit partition. For example, in FIG. 5A, for partition 0, a first quantum circuit instance 520-1 may be generated that operates on the qudits $q_0$, $q_1$ of qudit object 226. The first quantum circuit instance 520-1 may be generated using conforming quantum operators 230 from the quantum computing circuit 200 from partition 0, the first operator factor 512-1 of the first quantum operator 314 derived using Kronecker-factorization from the first non-conforming quantum operator 232, and the first operator factor 522-1 of the second quantum operator 314 derived using Kronecker-factorization from the second non-conforming quantum operator 232. In some embodiments, the first quantum circuit instance 520-1 may be reduced to a quantum circuit instance expressed as a quantum operator as shown at 520-1'. In the same way, for partition 1, a first quantum circuit instances 530-1 may be generated that operates on the qudits $q_2$, $q_3$ of qudit object 228. The first quantum circuit instance 530-1 may be generated using conforming quantum operators 230 from the quantum computing circuit 200 from partition 1, the first operator factor 532-1 of the first quantum operator 316 derived using Kronecker-factorization from the first non-conforming quantum operator 232, and the first operator factor 542-1 of the second quantum operator 316 derived using Kronecker-factorization from the second non-conforming quantum operator 232. In some embodiments, the first quantum circuit instance 530-1 may be reduced to a quantum circuit instance expressed as a quantum operator as shown at 530-1'.

To compute the next set of quantum circuit instances 136 (as shown in FIG. 5B) for partition 0, a second quantum circuit instance 520-2 may be generated that operates on the qudits $q_0$, $q_1$ of qudit object 226. The second quantum circuit instance 520-2 may be generated using conforming quantum operators 230 from the quantum computing circuit 200 from partition 0, the first operator factor 512-1 of the first quantum operator 314 derived using Kronecker-factorization from the first non-conforming quantum operator 232, and the second operator factor 522-2 of the second quantum operator 314 derived using Kronecker-factorization from the second non-conforming quantum operator 232. In some embodiments, the second quantum circuit instance 520-2 may be reduced to a quantum circuit instance expressed as a quantum operator as shown at 520-2'. In the same way, for partition 1, a second quantum circuit instances 530-2 may be generated that operates on the qudits $q_2$, $q_3$ of qudit object 228. The second quantum circuit instance 530-2 may be generated using conforming quantum operators 230 from the quantum computing circuit 200 from partition 1, the first operator factor 532-1 of the first quantum operator 316 derived using Kronecker-factorization from the first non-conforming quantum operator 232, and the second operator factor 542-2 of the second quantum operator 316 derived using Kronecker-factorization from the second non-conforming quantum operator 232. In some embodiments, the second quantum circuit instance 530-2 may be reduced to a quantum circuit instance expressed as a quantum operator as shown at 530-2'.

This process may be iteratively repeated over the possible permutations of operator factors 412 and 414 to compute the full set of quantum circuit instances 136 for each partition as shown at 550 in FIG. 5C. For partition 0, the quantum circuit instances 136 passed to the quantum circuit simulator 146 include the quantum circuit instances 552. In this example, the quantum circuit instances 552 may include sixteen individual quantum circuit instances accounting for the sixteen possible permutations of the operator factors 412 for partition 0 shown in FIG. 4. In other embodiments, the quantum circuit instances 552 may include a greater or fewer number of quantum circuit instances. For partition 1, the quantum circuit instances 136 passed to the quantum circuit simulator 146 include the quantum circuit instances 554. In this example, the quantum circuit instances 554 may include sixteen individual quantum circuit instances accounting for the sixteen possible permutations of the four operator factors 414 for partition 1 shown in FIG. 4. In other embodiments, the quantum circuit instances 554 may include a greater or few number of quantum circuit instances.

The set of quantum circuit instances 136 passed to the quantum circuit simulator 146 thus constitutes a set of reduced complexity quantum circuits derived from the partitioning and Kronecker-factorization of the quantum computing circuit 200. In this way, each circuit partition produced by the introduction of a partition boundary (e.g., partition boundary 220) renders a plurality of individual new circuit instances (e.g., quantum circuit instances 552 and 554) which may be independently simulated by the quantum circuit simulator 146 (e.g., in parallel and/or in series). The decomposition of the original quantum computing circuit 200 into separate circuit partitions, performed by the Kronecker factorization based quantum circuit partitioner 138, defines a framework wherein the quantum circuit instances 136 may be more efficiently represented and manipulated in the memory of the quantum simulation computing platform 120 using the qudit object for each circuit partition, as compared to using a complex state vector.

In some embodiments, the Kronecker factorization based quantum circuit partitioner 138 may determine how to partition the quantum computing circuit 200 using a partitioning algorithm. For example, selection of where to position a partition boundary 220 may be determined by the partitioning algorithm based on specifying parameters (such as target or maximum qudit group sizes, a target or maximum number of circuit partitions, for example), and the Kronecker factorization based quantum circuit partitioner 138 may generate permutations of possible partitions given the parameters. In some embodiments, these parameters may be entered into the simulation runtime software 130 by a user via the user device 116. The Kronecker factorization based quantum circuit partitioner 138 may vary the order of state vector qudits when determining the permutations of possible partitions based on the specified parameters. In some embodiments, the Kronecker factorization based quantum circuit partitioner 138 may favor identifying circuit partitions that satisfy the specified parameters while minimizing the creation of non-conforming quantum operators 232 per partition, since computational complexity is at least in part a function of the number of partition boundaries that result in non-conforming quantum operators 232. In some embodiments, the specified parameters entered into the simulation runtime software 130 may prescribe the number of circuit partitions to be formed by the Kronecker factorization based quantum circuit partitioner 138.

Figure 6:
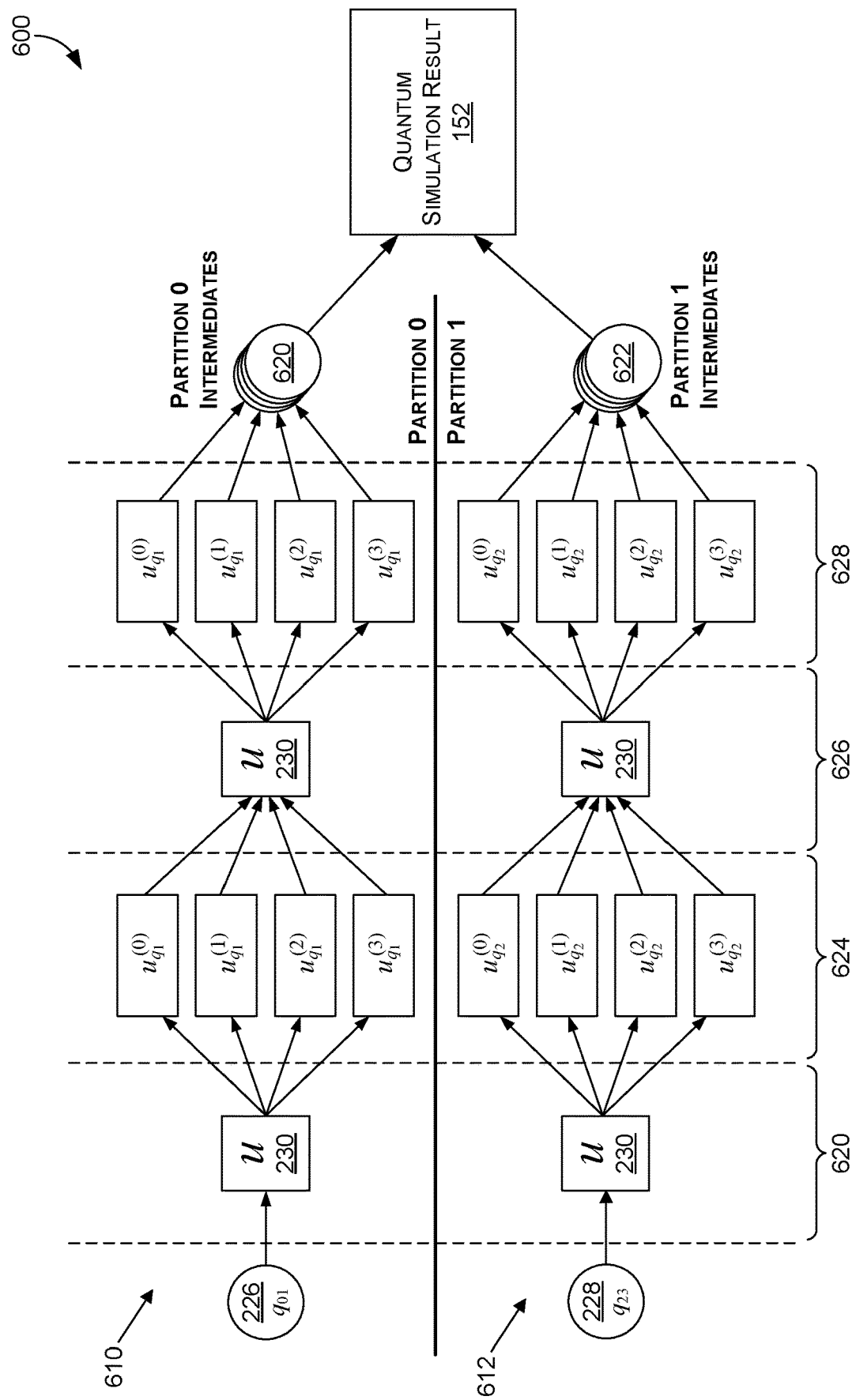
FIG. 6 is an illustration of simulating a quantum computing circuit by mapping quantum circuit instances to a multiway system, in accordance with some embodiments of the present disclosure.

Referring now to FIG. 6, in some embodiments, the quantum circuit simulator 146 may perform a simulation by mapping a plurality of paths corresponding to the quantum circuit instances 136 to a multiway system 600. Using the multiway system 600 a plurality of circuit paths for each qudit object may be computed in parallel by one or more processors of the quantum circuit simulator 146 with each path corresponding to a quantum circuit instance 136.

As shown in FIG. 6, using the set of quantum circuit instances 552 derived from quantum computing circuit 200, a first set of multiway system paths 610 for partition 0 is generated that operates on the first qudit object 226 that includes qudits $q_0$, $q_1$. Using the set of quantum circuit instances 554 derived from quantum computing circuit 200, a second set of multiway system paths 612 for partition 0 is generated for partition 1 and operates on the second qudit object 228 that includes qudits $q_2$, $q_3$.

Figure 7:
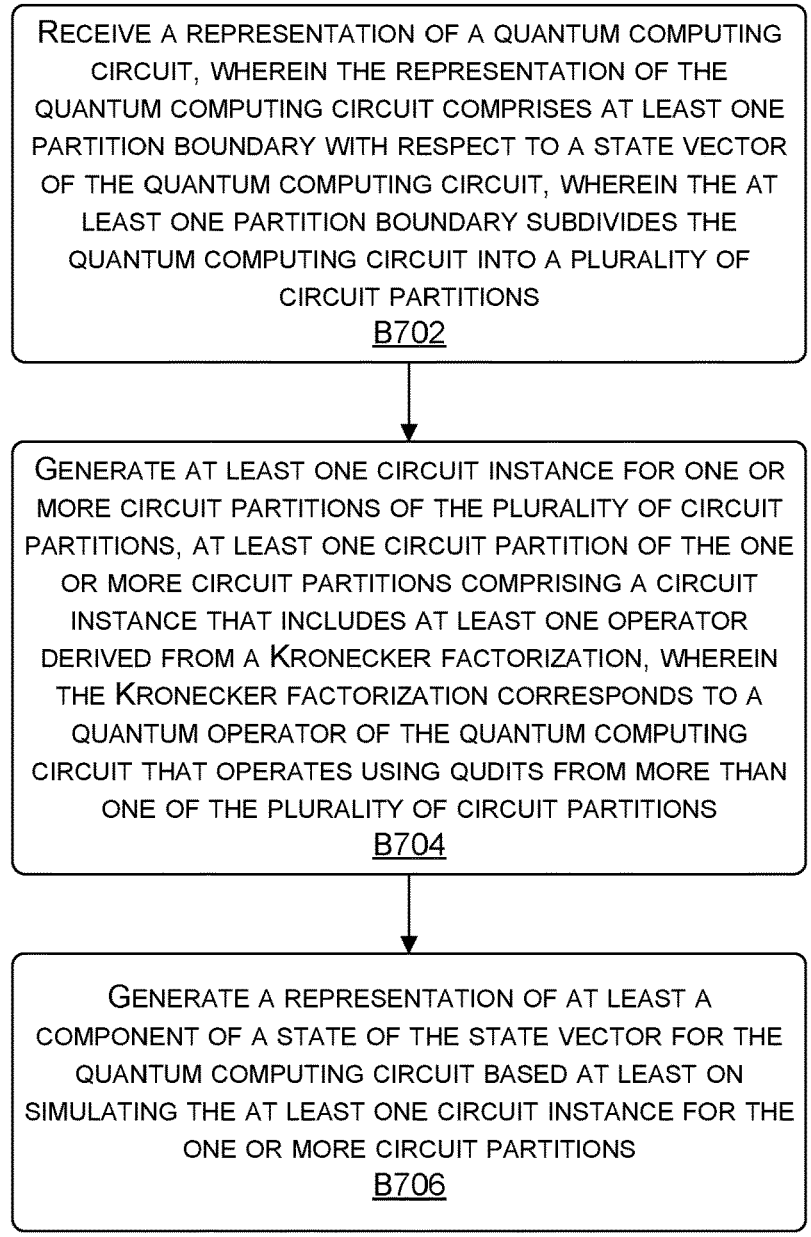
FIG. 7 is a flow diagram showing a method for simulation of quantum computing circuits using Kronecker factorization, in accordance with some embodiments of the present disclosure.

The circuit simulation executed by the quantum circuit simulator 146 may comprise traversing each permutation of the multiway system paths 610, 612 of the multiway system 600 and caching intermediates 620 and 622 produced from the execution of each path for each partition. As shown in FIG. 6, the multiway system 600 may be represented a series of circuit moments (e.g., circuit moments 620, 624, 626, and 628) that each multiway system path may pass through. In the multiway system 600, circuit moments 620 and 626 may include the conforming quantum operators 230 from the original quantum computing circuit 200 that operate on the qudit object of the respective partition. Circuit moments 620 and 626 may include the operator factors 412 and 414 derived from the Kronecker factorization of the non-conforming quantum operators 232. Intermediates 620 and 622 may be accumulated from the results of executing each of the quantum circuit instances 136 (e.g., the quantum circuit instances 552 of partition 0 and the quantum circuit instances 554 of partition 1). In some embodiments, the quantum simulation result 152 may be computed using a Kronecker product of the intermediates 620, 622 from each or the circuit partitions, producing a result that is representative of probing the at least a portion of the state of the original quantum computing circuit 200. From the quantum simulation result 152, the quantum circuit simulator 146 may, for example, extract one or more product states of the quantum computing circuit 200, obtain the expectation value of the original quantum computing circuit, sample at least one component of one or more product states of the final state, and/or compute a norm of the final state vector. For example, sampling may be used to approximate measuring of the quantum state of quantum computing circuit 200. Moreover, expectation values may be used in conjunction with machine learning models. For example, in some embodiments, an expectation value derived from the quantum simulation result 152 may be used as an input, or otherwise to inform a machine learning algorithm executing on the classical simulator 142. In some embodiments, Now referring to FIG. 7, FIG. 7 is a flow diagram showing a method 700 for simulation of quantum computing circuits using Kronecker factorization, in accordance with some embodiments of the present disclosure. It should be understood that the features and elements described herein with respect to the method 700 of FIG. 7 may be used in conjunction with, in combination with, or substituted for elements of, any of the other embodiments discussed herein and vice versa. Further, it should be understood that the functions, structures, and other descriptions of elements for embodiments described in FIG. 7 may apply to like or similarly named or described elements across any of the figures and/or embodiments described herein and vice versa.

Each block of method 700, described herein, comprises a computing process that may be performed using any combination of hardware, firmware, and/or software. For instance, various functions may be carried out by a processor executing instructions stored in memory. The methods may additionally, or alternatively, be embodied as computer-usable instructions stored on computer storage media. The methods may be provided by a standalone application, a service or hosted service (standalone or in combination with another hosted service), or a plug-in to another product, to name a few. In addition, method 700 is described, by way of example, with respect to the example quantum simulation computing platform 120 of FIG. 1. However, these methods may additionally or alternatively be executed by any one system, or any combination of systems, including, but not limited to, those described herein.

Method 700 at B702 includes receiving a representation of a quantum computing circuit, wherein the representation of the quantum computing circuit comprises at least one partition boundary with respect to a state vector of the quantum computing circuit, wherein the at least one partition boundary subdivides the quantum computing circuit into a plurality of circuit partitions. For example, in some embodiments, the Kronecker factorization based quantum circuit partitioner 138 partitions a quantum computing circuit by defining one or more partition boundaries with respect to a qudit array for the state vector. The partition boundary operates to subdivide the quantum computing circuit into a plurality of circuit partitions each comprising circuit paths 214 associated with one or more qudits of the state vector 210. The partitioned subset of the initial qudit array of the state vector within a circuit partition may define a qudit object for that partition. In some embodiments, the Kronecker factorization based quantum circuit partitioner 138 may select the at least one partition boundary based at least in part on an evaluation of permutations of possible circuit partitions of the quantum computing circuit. For example, the Kronecker factorization based quantum circuit partitioner 138 may receive a quantum computing circuit derived from a quantum computing component 114 of a hybrid computing component 110. Partitioning of the quantum computing circuit may be performed using a partitioning algorithm based on specifying one or more parameters. Example parameters may include, but are not limited to, a target qudit group size, a maximum qudit group size, a target number of circuit partitions, and/or a maximum number of circuit partitions. Partitioning of the quantum computing circuit may include varying the order of state vector qudits when determining the permutations of possible partitions based on the specified parameters. In some embodiments, partitioning may favor identifying circuit partitions that satisfy the specified parameters while minimizing the creation of non-conforming quantum operators per partition.

Method 700 at B704 includes generating at least one circuit instance for each of one or more circuit partitions of the plurality of circuit partitions, wherein at least one circuit partition of the one or more circuit partitions comprises a circuit instance that includes at least one operator derived from a Kronecker factorization that corresponds to a quantum operator, of the quantum computing circuit, that operates using qudits from more than one of the plurality of circuit partitions. As discussed herein, quantum operators that bridge a partition boundary (and thus operates using qudits from more than one of the plurality of circuit partitions) may be referred to herein as non-conforming quantum operators. The non-conforming quantum operators may each be factored by the Kronecker factorization based quantum circuit partitioner 138 along the partition boundary that they bridge to produce a sum of Kronecker-factorized operators. Each of the Kronecker-factorized operators may be represented as a sum of parallel quantum operators (corresponding Kronecker factors of the Kronecker-factorized operators) that independently act on the respective qudit objects for their respective separate partitions. In some embodiments, a plurality of individual quantum circuit instances 136 within each partition may be generated by Kronecker factorization based quantum circuit partitioner 138 by iteratively evaluating circuit paths for each qudit of the respective qudit objects through the possible permutations of each conforming quantum operators and Kronecker-factorized operators (for the non-conforming quantum operators) present within a circuit partition.

Method 700 at B706 includes generating a representation of at least a component of a state of the state vector for the quantum computing circuit based at least on simulating the at least one circuit instance for each of the one or more circuit partitions. For example, each circuit partition produced by the introduction of a partition boundary (e.g., partition boundary 220) renders a plurality of individual circuit instances (e.g., quantum circuit instances 552 and 554) which may be independently simulated by the quantum circuit simulator 146 (e.g., in parallel and/or in series). As such, the method may include executing simulations in parallel using at least one circuit instance for each of the one or more circuit partitions. The representation of components of the state of the state vector for the quantum computing circuit may be computed using one or more Kronecker products to combine the results of simulating the circuit instances. In some embodiment, simulating the circuit instances may be performed by the quantum circuit simulator 146 by mapping a plurality of paths corresponding to the quantum circuit instances to a multiway system, such as shown in FIG. 6. The multiway system may map at least one circuit instance for each of the one or more circuit partitions and the quantum circuit simulator 146 may execute the circuit paths for each of the one or more circuit partitions in parallel, and accumulate intermediates from the circuit paths for each of the at least one circuit instance to generate the representation of one or more components of the state of the state vector (e.g., to generate the quantum simulation result 152). In some embodiments, the quantum simulation results representing one or more components of the state of the state vector may be computed using a Kronecker product of the intermediates from each of the circuit paths. The representations of the state vector (and/or components of the state vector) for the quantum computing circuit may be used to determine an expectation value of the quantum computing circuit and/or to extract at least one component of product state of the quantum computing circuit.

Figure 8:
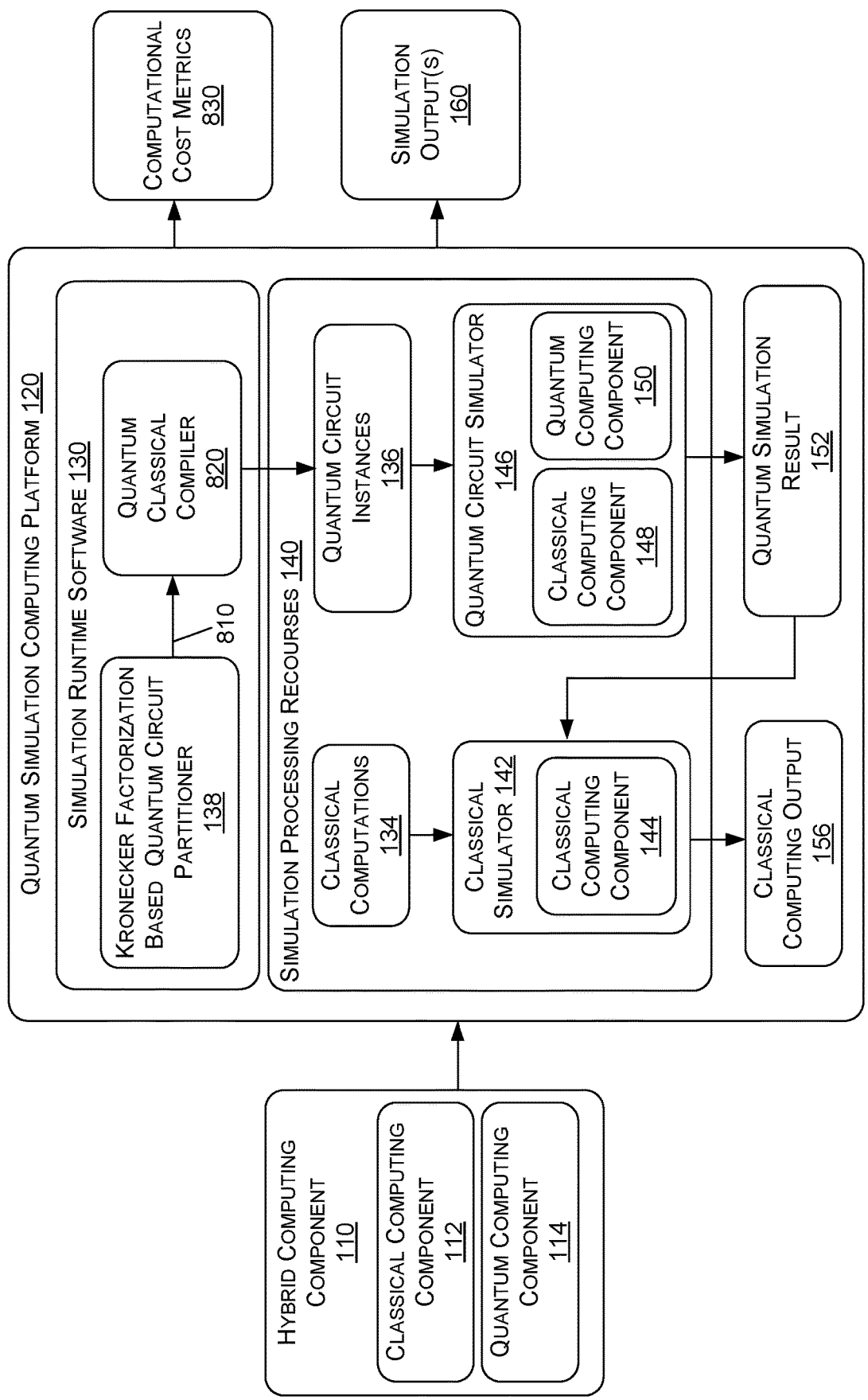
FIG. 8 is an illustration of an example flow diagram for a quantum simulation computing platform comprising a quantum classical compiler, in accordance with some embodiments of the present disclosure.

Referring now to FIG. 8, in some embodiments, the quantum simulation computing platform 120 may further comprise a quantum classical compiler 820. The quantum classical compiler 820 may be implemented in conjunction with the Kronecker factorization based quantum circuit partitioner 138 and in some embodiments integrated with the Kronecker factorization based quantum circuit partitioner 138. In some embodiments, the partitioning algorithm of the Kronecker factorization based quantum circuit partitioner 138 may generate one or more partitioning candidates 810 that each represent different potential ways in which the quantum computing circuit 200 can be subdivided into partitions using one or more partition boundaries 220. For example, in some embodiments, the partitioning algorithm may determine a plurality of different partitioning candidates 810 that satisfy the specified parameters (such as target or maximum qudit group sizes, a target or maximum number of circuit partitions, for example), and the quantum classical compiler 820 may further evaluate those partitioning candidates 810 to determine which partitioning candidate(s) 810 can be most efficiently executed by the quantum circuit simulator 146. The quantum classical compiler 820 may then output one or more computational costs metrics 830 (e.g., for display on user device 116) so that a user (e.g., a system designer) may select which partitioning candidate 810 to proceed with. The quantum classical compiler 820 may then pass the quantum circuit instances 136 for the selected partitioning candidate 810 to the quantum circuit simulator. In other embodiments, quantum classical compiler 820 may automatically select a partitioning candidate 810 based on one or more predetermine criteria (such as the partitioning candidate 810 that can be most efficiently executed).

For example, the quantum classical compiler 820 may compute computational costs via a runtime evaluation of the one or more partitioning candidates 810. The computational costs metrics 830 may include an output of the runtime evaluation may that provides a report of computational cost metrics associated with each of the one or more partitioning candidates 810, so that a user may select which partitioning candidate to use for execution by the quantum circuit simulator 146. The report may indicate whether the classical computing component(s) 148 and/or quantum computing component(s) 150 has sufficient resources to execute a simulation using the quantum circuit instances 136 of that partition candidate 810. In some embodiments, the runtime evaluation may further compare the computational cost metrics of different partitioning candidates 810 and automatically select a partitioning candidate 810 to execute, for example based on a lowest computational cost(s) and/or based on the configuration of simulator processing resources 140 available from the simulation computing platform 120.

For example, in performing the runtime evaluation of partition candidates 810, the quantum classical compiler 820 may consider the available hardware and runtime frameworks (e.g., software) available for simulating each partition candidate 810. For each partition candidate 810, the quantum classical compiler may iteratively compute computational cost metrics 830 for simulating the partition candidate 810 based on the available combinations of software and hardware and determine a configuration estimated to provide an optimal computational cost metric (e.g., the configuration that results in the lowest computational costs to execute that partition candidate 810). In some embodiments, the quantum classical compiler may iteratively loop through possible configurations of the classical computing component(s) 148 and/or quantum computing component(s) 150 resources available to the quantum circuit simulator until a configuration is found that meets computational cost metrics given a specified use parameter (e.g., a configuration that uses no more than a specified amount of memory and/or that meets a maximum simulation execution time). In some embodiments, when a partition candidate 810 is identified that meets a computational costs metric threshold, that partition candidate may be selected for processing and simulation by the quantum circuit simulator 146 as described herein. In some embodiments, computational cost metrics and/or memory requirements may be determined as a function of the number of nonconforming gates and/or number of partitions that a partition candidate 810 comprises. In some embodiments, the quantum classical compiler 820 may further compute computational cost metrics 830 and/or determine the selection of a partition candidate 810 to execute on the quantum circuit simulator 146 at least in part based on one or more computational cost metrics estimated for executing the classical computations 134 in combination with executing the quantum circuit instances 136 of a partition candidate 810 on the quantum circuit simulator 146.

Figure 9:
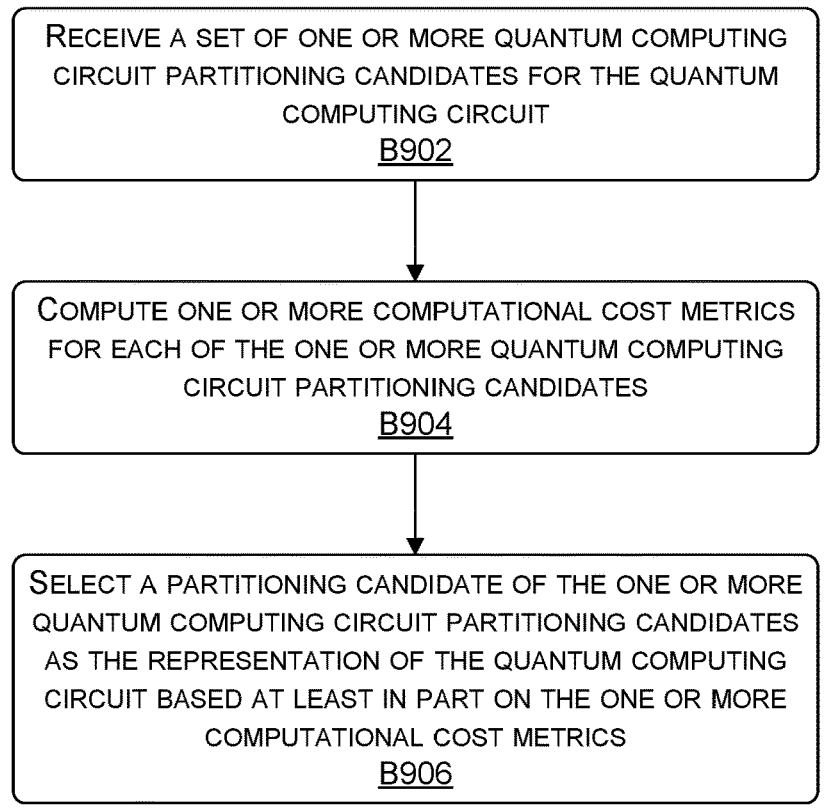
FIG. 9 is a flow diagram showing a method for optimizing a quantum computing circuit simulation using Kronecker factorization, in accordance with some embodiments of the present disclosure.

Now referring to FIG. 9, FIG. 9 is a flow diagram showing a method 900 for optimizing a quantum computing circuit simulation using Kronecker factorization, in accordance with some embodiments of the present disclosure. It should be understood that the features and elements described herein with respect to the method 900 of FIG. 9 may be used in conjunction with, in combination with, or substituted for elements of, any of the other embodiments discussed herein and vice versa. Further, it should be understood that the functions, structures, and other descriptions of elements for embodiments described in FIG. 9 may apply to like or similarly named or described elements across any of the figures and/or embodiments described herein and vice versa.

Each block of method 900, described herein, comprises a computing process that may be performed using any combination of hardware, firmware, and/or software. For instance, various functions may be carried out by a processor executing instructions stored in memory. The methods may be embodied as computer-usable instructions stored on computer storage media. The methods may be provided by a standalone application, a service or hosted service (standalone or in combination with another hosted service), or a plug-in to another product, to name a few. In addition, method 900 is described, by way of example, with respect to the example quantum simulation computing platform 120 of FIG. 1. However, these methods may additionally or alternatively be executed by any one system, or any combination of systems, including, but not limited to, those described herein.

Method 900 begins at B902 with receiving a set of one or more quantum computing circuit partitioning candidates for a quantum computing circuit. Each of the one or more quantum computing circuit partitioning candidates may define at least one respective partition boundary with respect to the state vector of the quantum computing circuit. The partition boundaries may subdivide the quantum computing circuit into the plurality of circuit partitions. As discussed herein, each circuit partition produced by the introduction of a partition boundary (e.g., partition boundary 220) renders a plurality of individual circuit instances (e.g., quantum circuit instances 552 and 554) which may be independently simulated by the quantum circuit simulator 146. In some embodiments, a partitioning algorithm of the Kronecker factorization based quantum circuit partitioner 138 may generate set of one or more quantum computing circuit partitioning candidates such that each partitioning candidate represents a different potential way in which the quantum computing circuit 200 can be subdivided into partitions using one or more partition boundaries 220.

The method 900 at B904 includes computing one or more computational cost metrics for each of the one or more quantum computing circuit partitioning candidates. For example, the computational costs metrics may include the results of a runtime evaluation may that estimates computational cost metrics associated with each of the one or more partitioning candidates. The one or more computational cost metrics may be computed based at least in part on the available hardware and runtime frameworks available for simulating each of the partition candidates. For example, for each partition candidate, the quantum classical compiler 820 may iteratively compute the computational cost metrics based on an available combination of software and hardware and determine a configuration estimated to provide an optimal computational cost metric. In some embodiments, computational cost metrics may be computed based at least in part on a number of quantum operators of the quantum computing circuit that operate using qudits from more than one of the plurality of circuit partitions. That is, estimates of computational cost metrics may be computed based on the depth of a qudit circuit paths corresponding to the quantum circuit instances of a partition candidate.

The method 900 at B906 includes selecting a partitioning candidate of the one or more quantum computing circuit partitioning candidates as the representation of the quantum computing circuit based at least in part on the one or more computational cost metrics. For example, in some embodiments, the partitioning algorithm may determine a plurality of different partitioning candidates 810 that satisfy the specified parameters (such as target or maximum qudit group sizes, a target or maximum number of circuit partitions, for example), and the quantum classical compiler 820 may further evaluate those partitioning candidates 810 to determine which partitioning candidate(s) 810 can be most efficiently executed by the quantum circuit simulator 146. For example, the quantum classical compiler 820 may consider the available hardware and runtime frameworks available for simulating each partition candidate 810 and/or may iteratively compute computational cost metrics based on the available combinations of software and hardware. The selection of the first of the one or more quantum computing circuit partitioning candidates may be based on determining a configuration estimated to provide an optimal computational cost metric (e.g., the configuration that results in the lowest computational costs to execute that partition candidate). In some embodiments, the quantum classical compiler may iteratively loop through possible configurations resources available to the quantum circuit simulator (e.g., resources of the classical computing component(s) 148 and/or quantum computing component(s) 150) until a configuration is found that meets computational cost metrics given a specified use parameter. When a partition candidate 810 is identified that meets a computational costs metric threshold, that partition candidate 810 may be selected for processing and simulation by the quantum circuit simulator 146.

Example Computing Device

Figure 10:
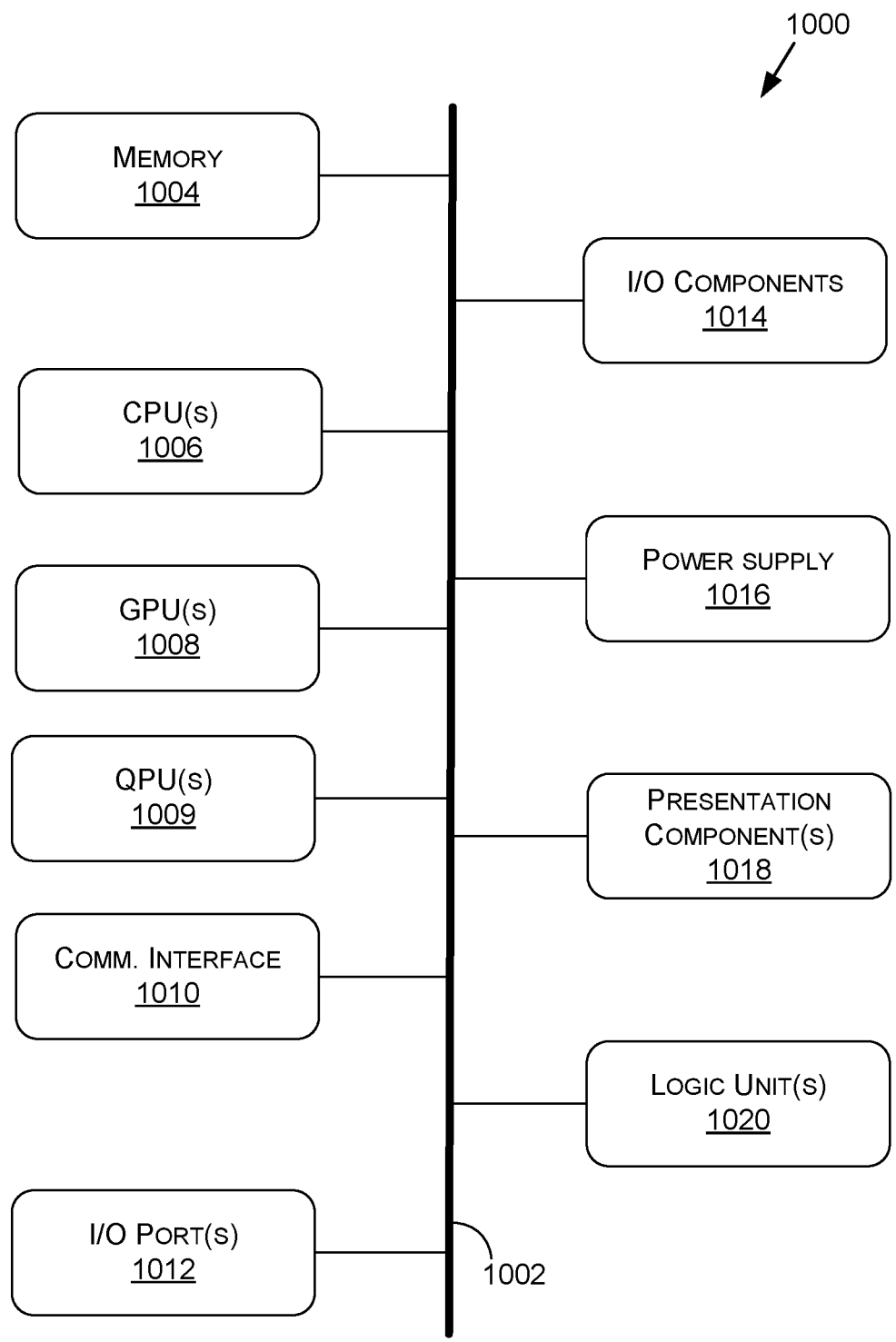
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, one or more quantum processing units (QPUs) 1009, a communication interface 1010, input/output (I/O) ports 1012, input/output components 1014, a power supply 1016, one or more presentation components 1018 (e.g., display(s)), and/or one or more logic units 1020. In some embodiments, quantum simulation computing platform 120 and/or simulation processing component(s) 140 are implemented at least in part using one or more of the CPU(s) 1006, GPU(s) 1008 and/or QPU(s) 1009. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally or alternatively, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.). In some embodiments, the HMI of user device 116 may be implemented at least in part using the presentation component(s) 1018

Example Data Center

Figure 11:
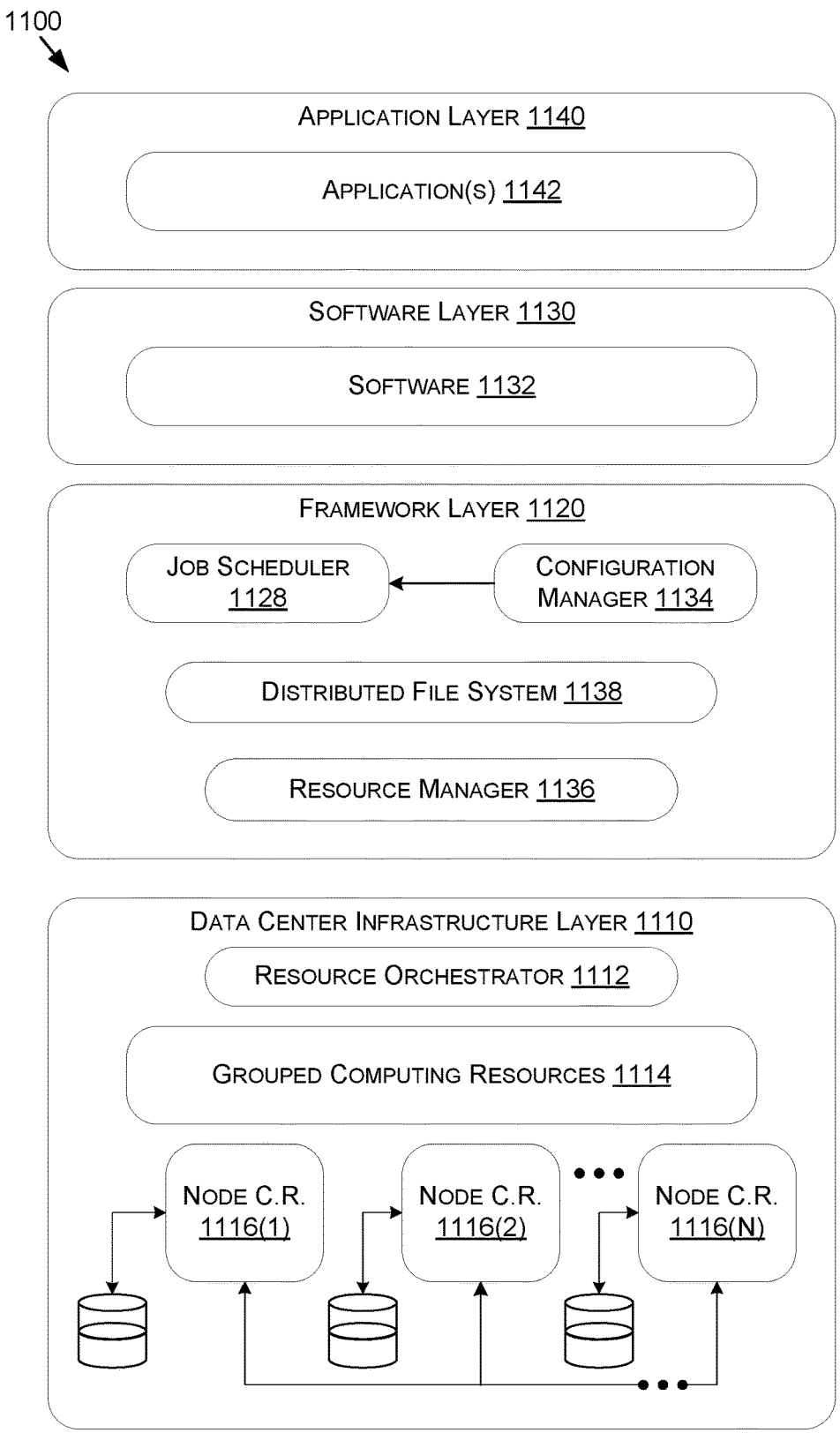
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116-1116(N) may correspond to a server having one or more of the above-mentioned computing resources. In addition, in some embodiments, the node C.R.s 1116(1)-11161(N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may include any number of power modules, cooling modules, and/or network switches, in any combination. In some embodiments, quantum simulation computing platform 120 and/or simulation processing component(s) 140 are implemented at least in part using one or more of the node C.R.s 1116(1)-1116(N).

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1128, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1128 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1128. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might additionally or alternatively be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A processor comprising:
one or more circuits to:
receive a representation of a quantum computing circuit, wherein the representation of the quantum computing circuit comprises at least one partition boundary, wherein the at least one partition boundary subdivides the quantum computing circuit into a plurality of circuit partitions;
generate at least one circuit instance for one or more circuit partitions of the plurality of circuit partitions, at least one circuit partition of the one or more circuit partitions comprising a circuit instance that includes at least one operator derived from a Kronecker factorization, wherein the Kronecker factorization corresponds to a quantum operator of the quantum computing circuit that operates using qudits from more than one of the plurality of circuit partitions; and
generate a representation of at least a component of a state of the state vector for the quantum computing circuit based at least on simulating the at least one circuit instance for the one or more circuit partitions.

2. The processor of claim 1, the one or more circuits further to:
select the at least one partition boundary based at least on an evaluation of possible permutations of circuit partitions of the quantum computing circuit.

3. The processor of claim 1, the one or more circuits further to:
map the at least one circuit instance for the one or more circuit partitions to a multiway system where circuit paths for the one or more circuit partitions are executed by at least one computing resource; and
accumulate intermediates from the circuit paths for the at least one circuit instance to generate the representation of at least the component of the state of the state vector.

4. The processor of claim 3, the one or more circuits further to:
execute the circuit paths for the one or more circuit partitions in parallel.

5. The processor of claim 1, the one or more circuits further to:
map the at least one circuit instance for the one or more circuit partitions to a multiway system where circuit paths for the one or more circuit partitions are executed in parallel;
accumulate intermediates from the circuit paths for the at least one circuit instance to generate the representation of at least the component of the state of the state vector; and
compute a quantum simulation result from a Kronecker product of the intermediates from the circuit paths.

6. The processor of claim 1, the one or more circuits further to:
execute in parallel a simulation of the at least one circuit instance for the one or more circuit partitions.

7. The processor of claim 1, wherein the representation of at least the component of the state of the state vector for the quantum computing circuit comprises an expectation value of the quantum computing circuit.

8. The processor of claim 1, the one or more circuits further to:
extract at least one component of a product state of the quantum computing circuit from the representation of at least the component of the state of the state vector.

9. The processor of claim 1, the one or more circuits further to:
receive a set of one or more quantum computing circuit partitioning candidates for the quantum computing circuit, the one or more quantum computing circuit partitioning candidates defining at least one respective partition boundary corresponding to the state vector of the quantum computing circuit, wherein the at least one respective partition boundary subdivides the quantum computing circuit into the plurality of circuit partitions;

compute one or more computational cost metrics for the one or more quantum computing circuit partitioning candidates; and select a partitioning candidate of the one or more quantum computing circuit partitioning candidates as the representation of the quantum computing circuit based at least on the one or more computational cost metrics.

10. The processor of claim 9, the one or more circuits further to:

compute the one or more computational cost metrics further based at least on an available configuration of computing resources.

11. The processor of claim 9, the one or more circuits further to:

select at least one computing resource for executing the partitioning candidate based at least on the one or more computational cost metrics.

12. The processor of claim 9, the one or more circuits further to:

compute the one or more computational cost metrics further based at least on a number of quantum operators of the quantum computing circuit that operate using qudits from more than one of the plurality of circuit partitions.

13. The processor of claim 1, wherein the processor is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for generating or presenting at least one of virtual reality content, augmented reality content, or mixed reality content;
- a system for performing deep learning operations;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center;
- a system implemented at least partially using cloud computing resources;
- a system implemented at least partially using quantum computing resources;
- a system utilizing a Quantum Processing Unit (QPU);
- a system for performing a state preparation;
- a system for compiling a quantum circuit;
- a system for executing a quantum circuit;
- a system for measuring a quantum state, or
- a system for measuring a state of a qubit or qubits.

14. A system comprising:

one or more processing units to execute operations comprising:

generating a representation of a quantum computing circuit that comprises at least one partition boundary that subdivides the quantum computing circuit into a plurality of circuit partitions;

performing a respective simulation for at least two circuit partitions of the plurality of circuit partitions, wherein at least a plurality of the respective simulations comprises at least one operator derived from a Kronecker factorization corresponding to a quantum operator of the quantum computing circuit that operates using qudits from more than one of the plurality of circuit partitions; and generating an output based at least on a representation of at least a component of a state of a state vector for the quantum computing circuit computed from the respective simulation of the plurality of circuit partitions.

15. The system of claim 14, the operations further comprising:

computing a quantum simulation result from a Kronecker product based on the plurality of circuit partitions.

16. The system of claim 14, the operations further comprising:

selecting the at least one partition boundary based at least on evaluating possible permutations of circuit partitions of the quantum computing circuit.

17. The system of claim 14, the operations further comprising:

extracting at least one component of a product state of the quantum computing circuit from the representation of at least the component of the state of the state vector.

18. The system of claim 14, the operations further comprising:

mapping at least one circuit instance from the plurality of circuit partitions to a multiway system where circuit paths for the plurality of circuit partitions are executed by at least one computing resource; and accumulating intermediates from the circuit paths for the at least one circuit instance to generate the representation of at least the component of the state of the state vector.

19. The system of claim 14, where the representation of at least the component of the state of the state vector for the quantum computing circuit comprises an expectation value of the quantum computing circuit.

20. The system of claim 14, the operations further comprising:

computing one or more computational cost metrics for the representation of the quantum computing circuit based at least on an available configuration of computing resources.

21. The system of claim 14, wherein the system is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for generating or presenting at least one of virtual reality content, augmented reality content, or mixed reality content;
- a system for performing deep learning operations;
- a system implemented using an edge device;
- a system implemented using a robot;
- a system for performing conversational AI operations;

a system for generating synthetic data;
a system incorporating one or more virtual machines (VMs);
a system implemented at least partially in a data center;
a system implemented at least partially using cloud computing resources;
a system implemented at least partially using quantum computing resources;
a system utilizing a Quantum Processing Unit (QPU);
a system for performing a state preparation;
a system for compiling a quantum circuit;
a system for executing a quantum circuit;
a system for measuring a quantum state, or
a system for measuring a state of a qubit or qubits.

* * * * *